United States Patent
Yamamoto et al.

(10) Patent No.: US 8,610,050 B2
(45) Date of Patent: Dec. 17, 2013

(54) OPTICAL DISPLACEMENT DETECTION APPARATUS

(75) Inventors: Eiji Yamamoto, Musashimurayama (JP); Aiko Yoshida, Higashimurayama (JP)

(73) Assignee: Olympus Corporation, Tokyo (JP)

( * ) Notice: Subject to any disclaimer, the term of this patent is extended or adjusted under 35 U.S.C. 154(b) by 114 days.

(21) Appl. No.: 13/359,676

(22) Filed: Jan. 27, 2012

(65) Prior Publication Data

US 2012/0126103 A1    May 24, 2012

Related U.S. Application Data

(63) Continuation of application No. PCT/JP2010/062846, filed on Jul. 29, 2010.

(30) Foreign Application Priority Data

Jul. 31, 2009 (JP) ................................. 2009-179693

(51) Int. Cl.
*G01D 5/347* (2006.01)

(52) U.S. Cl.
USPC .................. 250/231.13; 250/231.18; 356/614; 356/616

(58) Field of Classification Search
USPC ............ 250/231.13, 231.14, 231.16, 231.17, 250/231.18, 559.29; 356/614–617, 619, 356/620, 622
See application file for complete search history.

(56) References Cited

U.S. PATENT DOCUMENTS

2005/0133705 A1* 6/2005 Hare et al. ............... 250/231.13
2011/0122422 A1* 5/2011 Yamamoto et al. .......... 356/614

FOREIGN PATENT DOCUMENTS

| JP | 48-78959 | | 10/1973 |
|---|---|---|---|
| JP | 1-170812 | A | 7/1989 |
| JP | 3-189563 | A | 8/1991 |
| JP | 4-136717 | | 5/1992 |
| JP | 8-98838 | A | 4/1996 |
| JP | 2003-247864 | | 9/2003 |
| JP | 2007-33100 | | 2/2007 |
| JP | 2007-40958 | | 2/2007 |

OTHER PUBLICATIONS

International Search Report dated Oct. 12, 2010 issued in PCT/JP2010/062846.
International Preliminary Report on Patentability together with the Written Opinion PCT/JP2010/062846 dated Feb. 16, 2012.
Japanese Office Action dated Aug. 6, 2013 from related Japanese Patent Application No. 2009-179693, together with an English language translation.

* cited by examiner

*Primary Examiner* — Kevin Pyo
(74) *Attorney, Agent, or Firm* — Scully, Scott, Murphy & Presser, P.C.

(57) ABSTRACT

An optical displacement detection apparatus includes a scale and a sensor head. The scale has a first and second pattern. The head includes a first photodetector that detects a beam through the first pattern and generates a first signal, and a second photodetector that detects the beam through the second pattern and generates a second signal. The first and second signals include a first component, and a second component that corresponds to an absolute displacement of the scale. The first pattern, the second pattern, the first photodetector, the second photodetector, and a beam source are disposed such that the detection of the first photodetector and the detection of the second photodetector are performed correlatively.

14 Claims, 21 Drawing Sheets

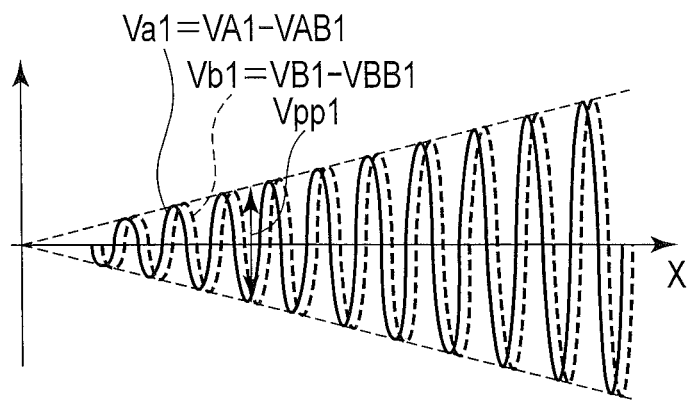
F I G. 6A
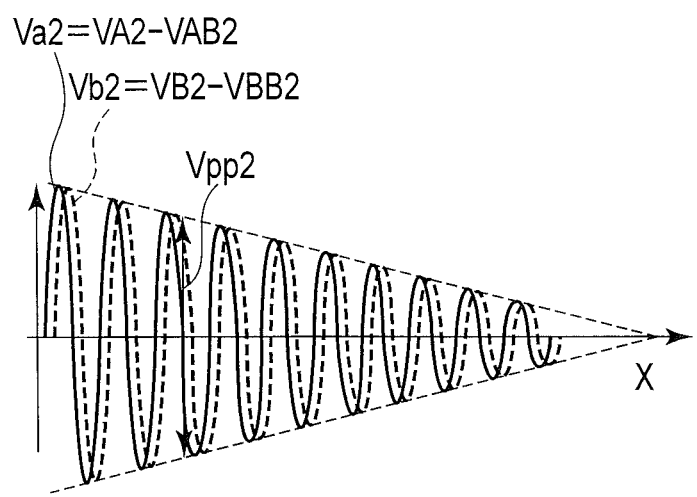
F I G. 6B

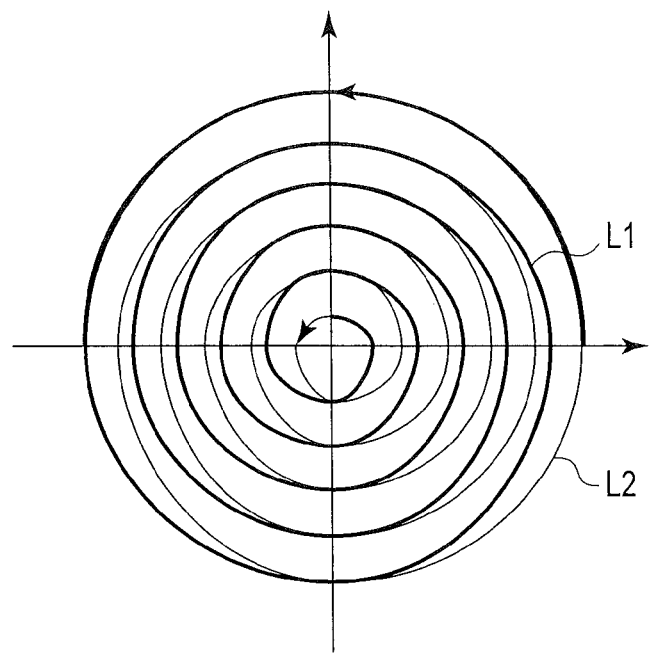
F I G. 13
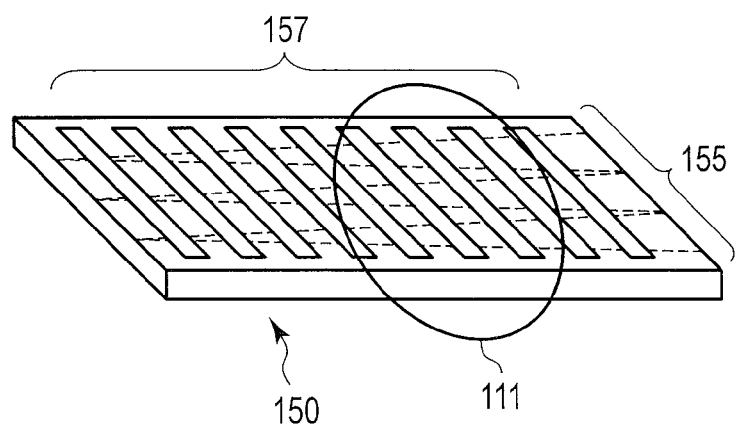
F I G. 14

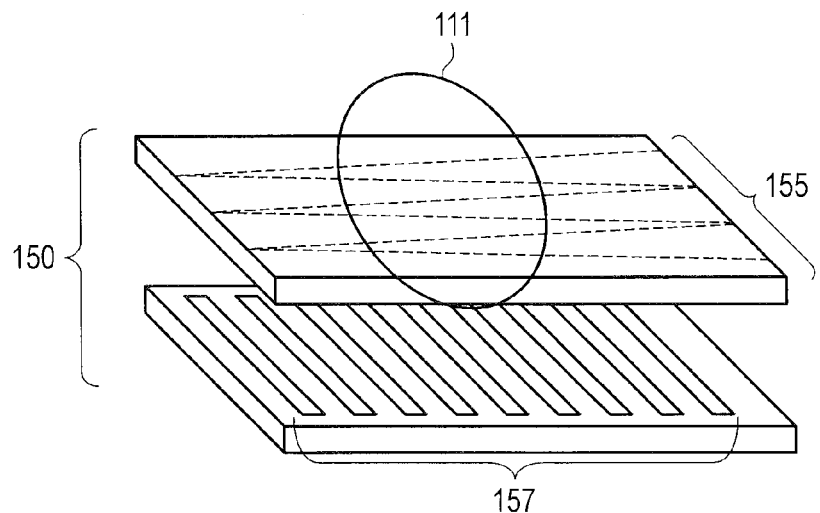
F I G. 15
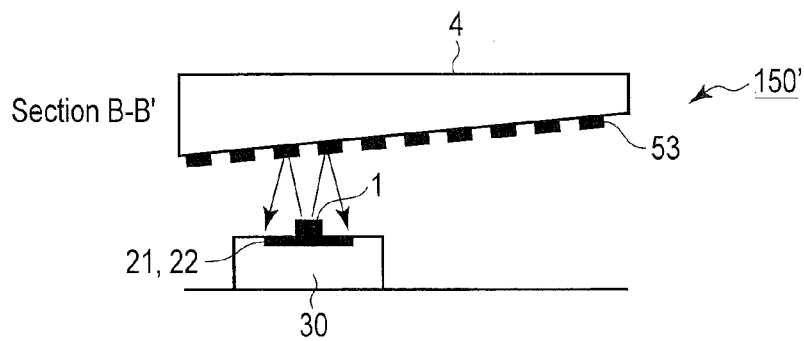
F I G. 16A
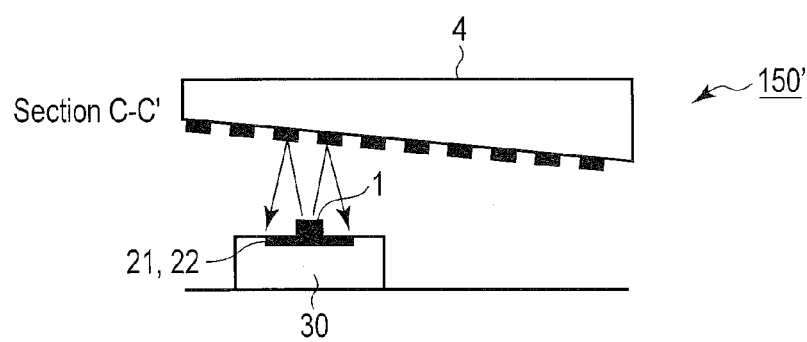
F I G. 16B

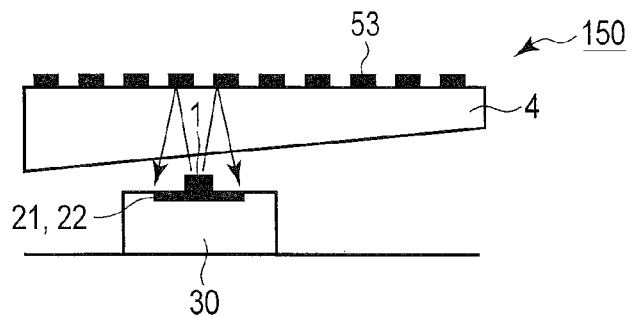
F I G. 17A
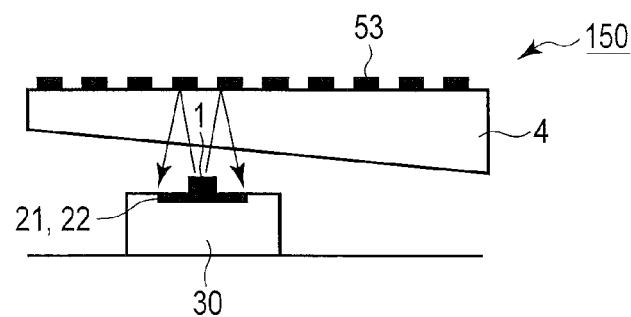
F I G. 17B
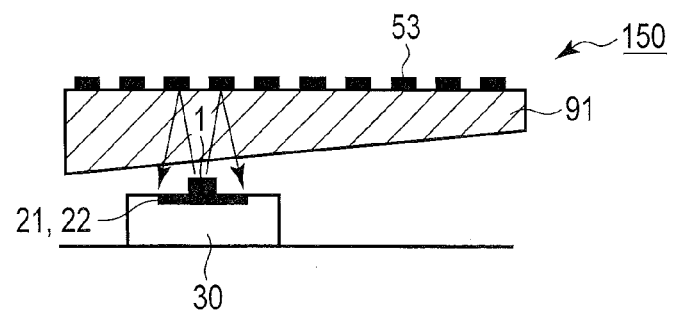
F I G. 18A

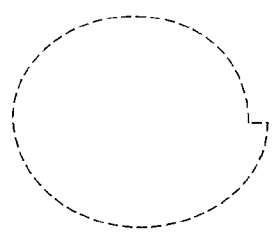
F I G. 20B
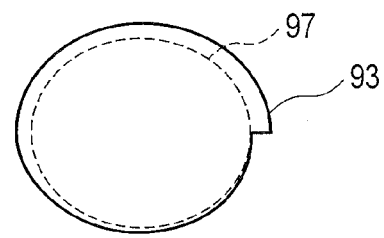
F I G. 21A
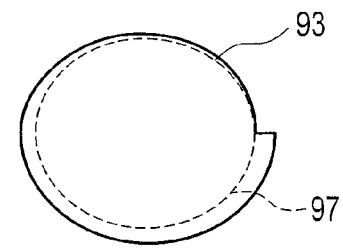
F I G. 21B
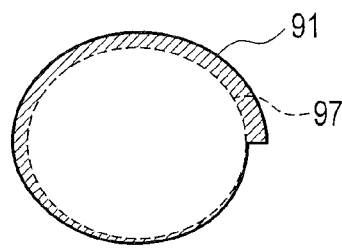
F I G. 22A Section of 52

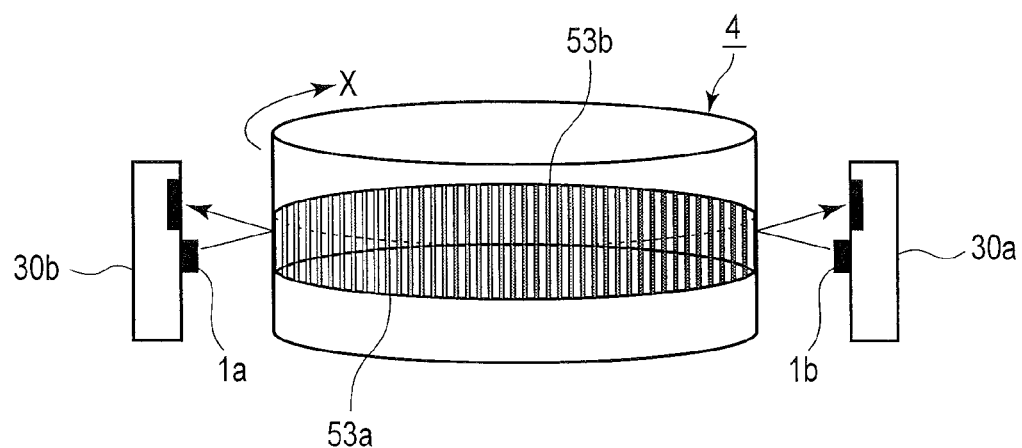
F I G. 25
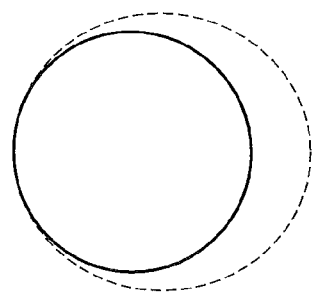
F I G. 26

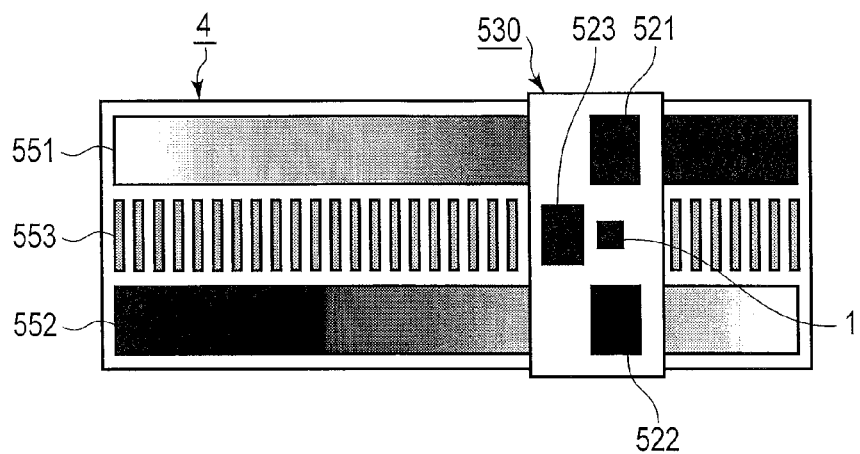
F I G. 29
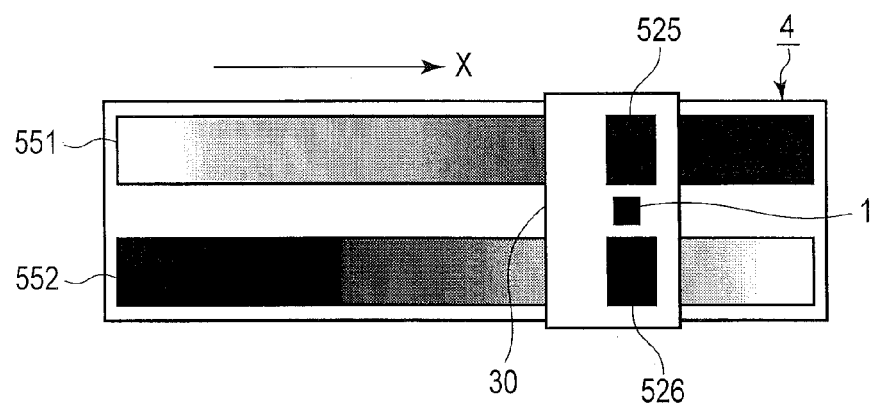
F I G. 30
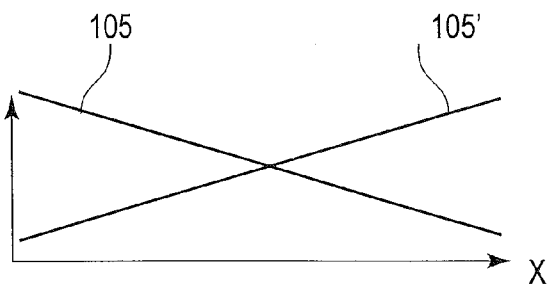
F I G. 31

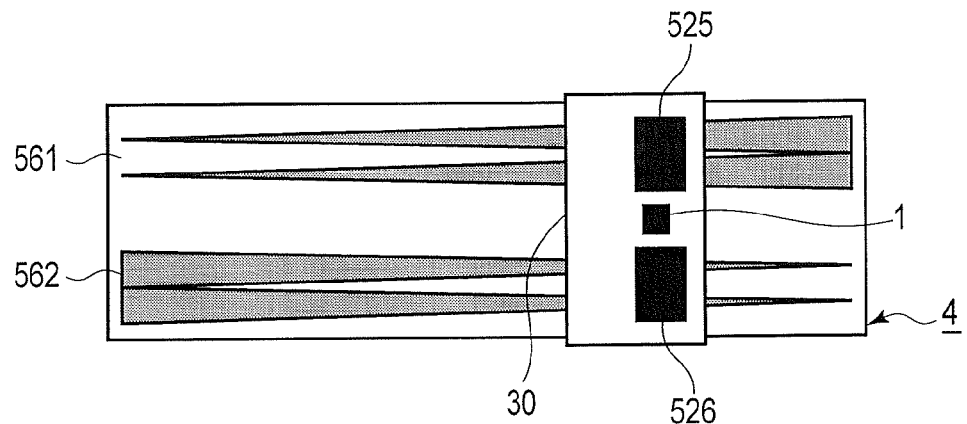
F I G. 32

OPTICAL DISPLACEMENT DETECTION APPARATUS

CROSS REFERENCE TO RELATED APPLICATIONS

This application is a Continuation Application of PCT Application No. PCT/JP2010/062846, filed Jul. 29, 2010 and based upon and claiming the benefit of priority from prior Japanese Patent Application No. 2009-179693, filed Jul. 31, 2009, the entire contents of all of which are incorporated herein by reference.

BACKGROUND OF THE INVENTION

1. Field of the Invention

The present invention relates to a scale in which a predetermined pattern is formed and an optical displacement detection apparatus that detects a displacement with a head in which a sensor is provided.

2. Description of the Related Art

For example, Jpn. Pat. Appln. KOKAI Publication No. 48-78959 discloses the following technology as a technology relating to the optical displacement detection apparatus.

In the photoelectric detection apparatus disclosed in Jpn. Pat. Appln. KOKAI Publication No. 48-78959, slits or reflecting surfaces are provided in line at constant intervals in a test object, and optical pulses derived from the slits or the reflecting surfaces are detected. The photoelectric detection apparatus is configured such that lengths of the slits or the reflecting surfaces are sequentially increased clockwise.

FIG. 33 is a sectional view illustrating a photoelectric detection apparatus disclosed in Jpn. Pat. Appln. KOKAI Publication No. 48-78959. As illustrated in FIG. 33, the slit of a scale 4 that is of the test object is irradiated with a light beam emitted from a light source 1, and the transmitted light is detected by a photodetector 2.

FIG. 34 is a plan view of the scale 4. As illustrated in FIG. 34, the lengths of the slits provided in the scale 4 are increased or decreased from a reference position at constant intervals relative to a rotating direction indicated by an arrow.

FIG. 35 is a view illustrating an output signal of the photoelectric detection apparatus. In the graph illustrated in FIG. 35, a horizontal axis indicates a rotation angle of the test object, and a vertical axis indicates an output of the photodetector 2. When the scale 4 rotates counterclockwise, an aperture length of the slit is decreased. Jpn. Pat. Appln. KOKAI Publication No. 48-78959 describes that a characteristic in which the amplitude of periodic signal is gradually decreased is obtained as illustrated in FIG. 35.

Jpn. Pat. Appln. KOKAI Publication No. 48-78959 describes that a rotation speed is detected by properly calculating the periodic signal from the photodetector 2, and a change in amplitude is detected, which allows the rotating direction of the scale 4 to be detected.

Although not described in Jpn. Pat. Appln. KOKAI Publication No. 48-78959, in detecting an absolute position by the above configuration, magnitude of an amplitude 104 (see FIG. 36) or a DC component 102 (see FIG. 37) of the output signal is previously checked relative to a rotation displacement such that the absolute position of a rotation angle of the scale 4 can be detected from the reference position by measuring the amplitude or the DC level of the output signal.

That is, the photoelectric detection apparatus disclosed in Jpn. Pat. Appln. KOKAI Publication No. 48-78959 detects the movement direction or the absolute position of the test object based on the amplitude of the detection signal that is changed according to movement of the test object.

In the technology disclosed in Patent Literature 1, as illustrated in FIG. 37, actually an output signal 101 has the DC component 102 that is largely influenced by an optical disposition of the light source 1 or the scale 4. As illustrated in FIG. 37, the DC component 102 is shifted as the amplitude of the detection signal is displaced.

It is assumed that the aperture length of the slit is decreased in order to improve detection sensitivity of the absolute position or to widen an absolute position detection range. In this case, the amplitude of the detection signal is decreased with decreasing minimum value of the aperture length of the slit. Accordingly, in this case, a noise component of the periodic signal from the photodetector 2 is relatively increased, and detection performance (resolution and stability) is degraded at a displacement point where the slit has a small aperture length.

Additionally, when the absolute position is detected by the configuration disclosed in Patent Literature 1, it is necessary to previously check the characteristic of the amplitude 104 of the output signal relative to the rotation displacement. As illustrated by the amplitude 104 and an amplitude 104' of FIG. 36, the characteristic 104 of the amplitude of the output signal relative to the rotation displacement is changed due to, for example, an ambient environment, attaching looseness of a sensor, and a change with time. Accordingly, the absolute position is detected with significantly low accuracy.

In the technology disclosed in Patent Literature 1, when the detection sensitivity of the absolute position is improved, or when the detection range is widened, the resolution and the stability are significantly deteriorated in both the absolute position detection and the relative position detection.

In view of the foregoing, an object of the invention is to provide an optical displacement detection apparatus in which the improvement of the detection sensitivity of the absolute position and the enlarged detection range are implemented while the resolution and the stability are maintained at a high level in both the absolute position detection and the relative position detection.

BRIEF SUMMARY OF THE INVENTION

The invention can provide the optical displacement detection apparatus in which the improvement of the detection sensitivity of the absolute position and the enlarged detection range are implemented while the resolution and the stability are maintained at a high level in both the absolute position detection and the relative position detection.

In order to achieve the above object, according to a first aspect of the invention, there is provided an optical displacement detection apparatus that detects a displacement in a predetermined direction of a displacement detection target, the optical displacement detection apparatus comprising:

a light source that emits a light beam;

a scale in which a first track pattern and a second track pattern are formed while the predetermined direction is set to a longitudinal direction of each of the first track pattern and the second track pattern;

a sensor head including a first photodetector that detects the light beam emitted from the light source through the first track pattern and generates a first signal and a second photodetector that detects the light beam emitted from the light source through the second track pattern and generates a second signal; and a signal processing unit that calculates the displacement based on the first signal and the second signal, wherein the scale or the sensor head is coupled to the displacement detection target, the first signal and the second signal include at least a first component that is offset by performing predetermined calculation of the first signal and the second signal and a second component that remains after the predetermined calculation and corresponds to an absolute displacement of the scale, and the first track pattern, the second track pattern, the first photodetector, the second photodetector, and the light source are disposed such that the detection of the first photodetector and the detection of the second photodetector are performed while correlated with each other.

According to the invention, it is possible to provide an optical displacement detection apparatus that detects a displacement in a predetermined direction of a displacement detection target, comprising: a light source that emits a light beam;

a scale in which a first track pattern and a second track pattern are formed on an identical surface while the predetermined direction is set to a longitudinal direction of each of the first track pattern and the second track pattern;

a sensor head including a first photodetector that detects the light beam, which is emitted from the light source and reflected by the first track pattern, and generates a first signal and a second photodetector that detects the light beam, which is emitted from the light source and reflected by the second track pattern, and generates a second signal; and a signal processing unit that calculates the displacement based on the first signal and the second signal, wherein the scale or the sensor head is coupled to the displacement detection target, the first signal and the second signal include at least a first component that is offset by performing predetermined calculation of the first signal and the second signal and a second component that remains even after the predetermined calculation and is unique to an arbitrary position, and the first track pattern, the second track pattern, the first photodetector, the second photodetector, and the light source are disposed such that the detection of the first photodetector and the detection of the second photodetector are performed while correlated with each other.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

FIG. 6A is a view illustrating examples of signals that are obtained by subtracting reverse-phase signals from each other in the four signals output from the four groups of the light receiving element arrays of the first photodetector.

FIG. 6B is a view illustrating examples of signals that are obtained by subtracting reverse-phase signals from each other in the four signals output from the four groups of the light receiving element arrays of the second photodetector.

FIG. 13 is a view illustrating an example of a Lissajous figure that is used in absolute displacement detection processing.

FIG. 14 is a perspective view illustrating a configuration example of a modulation code pattern unique to an optical displacement detection apparatus according to a first modification of the invention.

FIG. 15 is a perspective view illustrating a configuration example of a modulation code pattern unique to an optical displacement detection apparatus according to a second modification of the invention.

FIG. 16A is a sectional view illustrating a configuration example of a scale in which a modulation code pattern according to a third modification is provided.

FIG. 16B is a sectional view illustrating a configuration example of the scale in which the modulation code pattern of the third modification is provided.

FIG. 17A is a sectional view illustrating a configuration example of a scale in which a modulation code pattern according to a fourth modification is provided.

FIG. 17B is a sectional view illustrating a configuration example of the scale in which the modulation code pattern of the fourth modification is provided.

FIG. 18A is a sectional view illustrating a configuration example of a scale in which a modulation code pattern according to a fifth modification is provided.

FIG. 20B is a sectional view illustrating a configuration example of the scale of the seventh modification.

FIG. 21A is a sectional view illustrating a configuration example of a scale according to an eighth modification.

FIG. 21B is a sectional view illustrating a configuration example of the scale of the eighth modification.

FIG. 22A is a sectional view illustrating a configuration example of a scale according to a ninth modification.

FIG. 25 is a view illustrating a configuration example of an optical displacement detection apparatus according to an eleventh modification.

FIG. 26 is a sectional view illustrating the case in which a scale according to a twelfth modification is cut in a position where a modulation code pattern is provided in an outer circumferential surface.

FIG. 29 is a view illustrating a configuration example of a scale of an optical displacement detection apparatus according to a third embodiment of the invention.

FIG. 30 is a view illustrating a configuration example of a scale of an optical displacement detection apparatus according to a fifteenth modification.

FIG. 31 is a view illustrating characteristics of signals that are obtained from the first photodetector and the second photodetector.

FIG. 32 is a view illustrating a configuration example of a scale and a sensor head, which are unique to an optical displacement detection apparatus according to a sixteenth modification.

DETAILED DESCRIPTION OF THE INVENTION

Hereinafter, embodiments of the invention will be described with reference to the drawings.

First Embodiment

Figure 1:
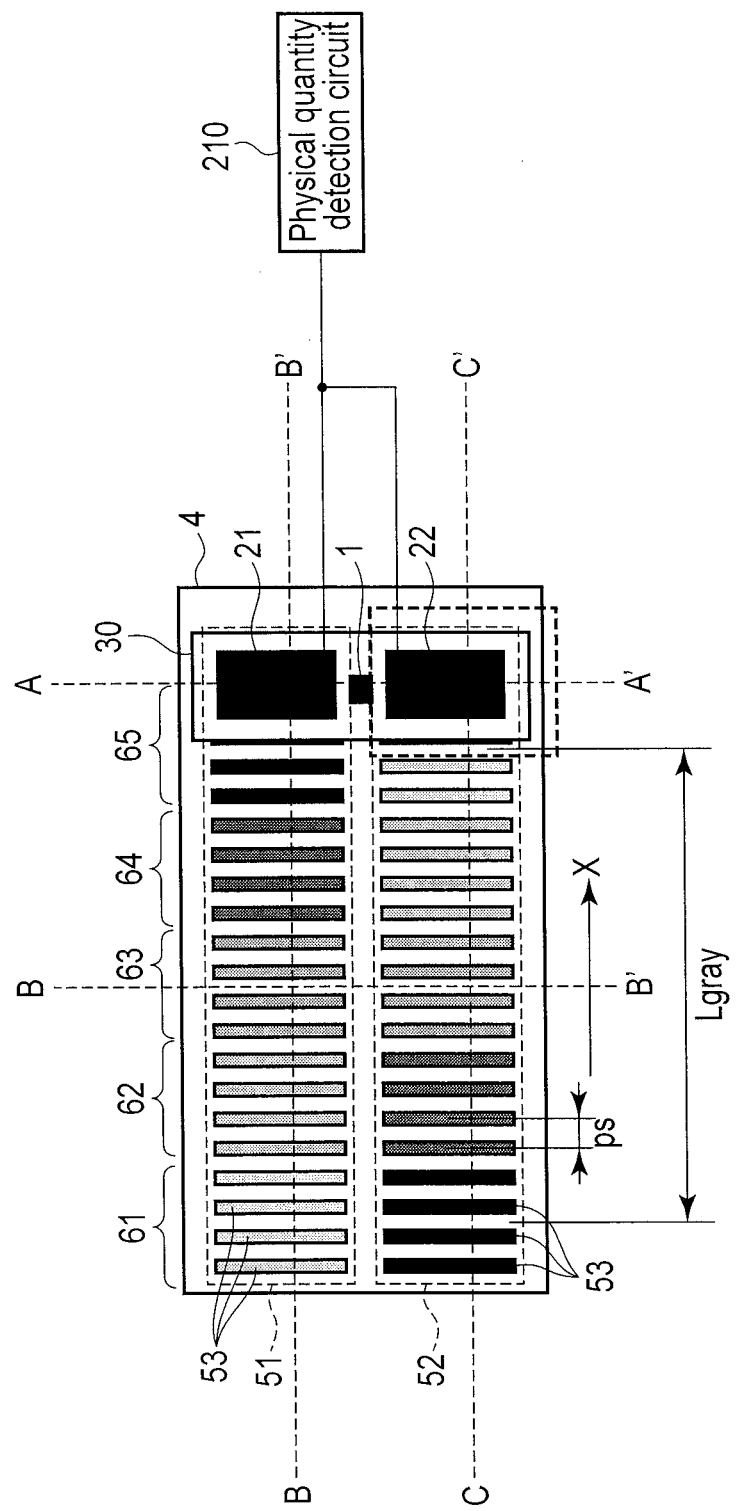
FIG. 1 is a perspective chart illustrating a sensor head and a scale of an optical displacement detection apparatus according to a first embodiment of the invention when viewed from above.
Figure 2:
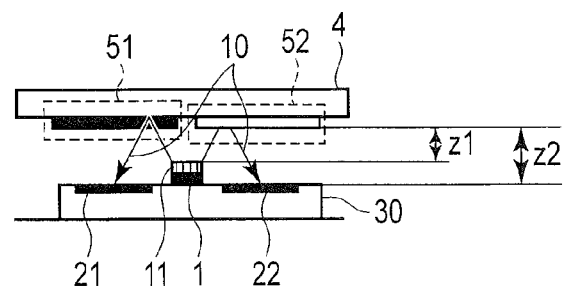
FIG. 2 is a sectional view taken on a line segment A-A' of FIG. 1.
Figure 3:
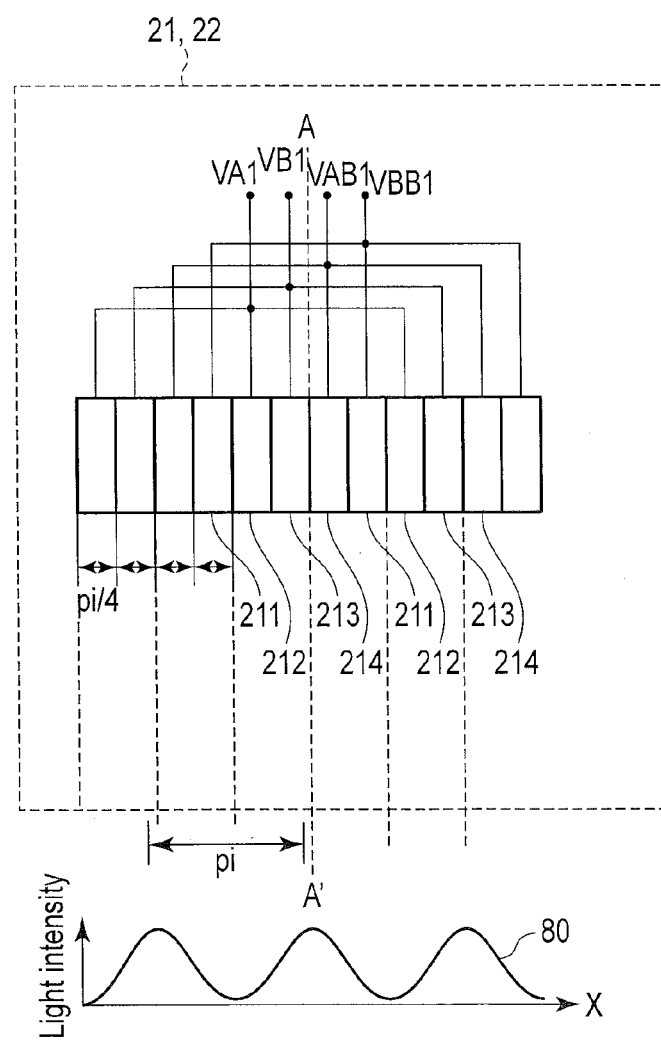
FIG. 3 is a view illustrating an example of a relationship among a light receiving element array mounted on a first photodetector, a light receiving element array mounted on a second photodetector, and an optical image that is formed on a light receiving surface constructed by the light receiving element arrays.

FIG. 1 is a perspective chart illustrating a sensor head and a scale of an optical displacement detection apparatus according to a first embodiment when viewed from above. FIG. 2 is a sectional view taken on a line segment A-A' of FIG. 1. FIG. 3 is a view illustrating an example of a relationship among a light receiving element array mounted on a first photodetector 21, a light receiving element array mounted on a second photodetector 22, and an optical image that is formed on a light receiving surface constructed by the light receiving element arrays.

In the first embodiment, various patterns formed in the scale are defined as follows.

<Gray Scale Pattern>

An optical pattern in which an effective reflectance or an effective transmittance is gradually increased or decreased in a predetermined zone in a predetermined direction is referred to as a "gray scale pattern".

<Encode Pattern>

An optical pattern in which one of a reflectance, a transmittance, and a diffraction characteristic is periodically changed according to procession in a predetermined direction is referred to as an "encode pattern".

<Modulation Code Pattern>

A pattern having an optical characteristic in which the encode pattern and the gray scale pattern are superposed is referred to as a "modulation code pattern".

<Gray Track>

A track constructed by the gray scale pattern or the modulation code pattern is referred to as a "gray track".

As illustrated in FIG. 1, the optical displacement detection apparatus of the first embodiment includes a scale 4, a sensor head 30, and a physical quantity detection circuit 210.

A gray track 51 and a gray track 52, which are constructed by, for example, the modulation code pattern, are arrayed in parallel on a surface of the scale 4.

A light source 1, a first photodetector 21, and a second photodetector 22 are provided in the sensor head 30.

The tracks (the gray track 51 and the gray track 52) provided in two rows on the scale 4 are irradiated with a light beam (a light beam 10 illustrated in FIG. 2) emitted from the light source 1, the light beam is reflected by the modulation code pattern on each track. Then the light beam is incident to a light receiving surface of each of the first photodetector 21 and the second photodetector 22, which are mounted on the sensor head 30. For example, as illustrated in FIG. 3, an optical image 80 corresponding to each modulation code pattern is formed on the light receiving surface.

The light receiving surface (a surface in which the first photodetector 21 and the second photodetector 22 are provided) of the sensor head 30 and a surface (a surface in which the gray tracks 51 and 52 are provided) in which the modulation code pattern is formed in the scale 4 are disposed in parallel so as to be opposite each other.

One of the scale 4 and the sensor head 30 is coupled to a target whose displacement is measured, and the other that is not coupled to the target is coupled to a reference surface.

Assuming that an x-direction illustrated in FIG. 1 is a direction in which the displacement of the displacement detection target is detected, the "predetermined direction" corresponds to the x-direction. A spatial pitch of an optical pattern 53 in which one of the reflectance, the transmittance, and the diffraction characteristic is periodically changed corresponds to ps illustrated in FIG. 1.

In the configuration of the first embodiment, the predetermined number of periodic patterns of the encode pattern is grouped (for example, groups 61, 62, 63, 64, and 65 illustrated in FIG. 1), and the effective reflectance or the effective transmittance is gradually increased or decreased in each group.

In the example of FIG. 2, a slit 11 having a period po is provided in the x-direction on an upper surface of the light source 1. The configuration of FIG. 2 is adopted in the case in which an optical image forming principle by a triple-lattice configuration is utilized. Accordingly, it is not always necessary to provide the slit 11 in the case in which another image forming principle is utilized.

In the optical displacement detection apparatus of the first embodiment, the light source 1, the first photodetector 21, the second photodetector 22, the modulation code pattern on the gray track 51, and the modulation code pattern on the gray track 52 are disposed as follows. Each component is disposed and configured such that the effective reflectance or the effective transmittance of the modulation code pattern is detected in reverse phase by the first photodetector 21 and the second photodetector 22 when the displacement detection target is displaced in the x-direction. An example of the disposition/configuration will specifically be described below.

For example, the modulation code pattern is generated and disposed in each of the gray tracks 51 and 52 such that a light emitting portion of the light source 1 and centers of the first photodetector 21 and the second photodetector 22 are disposed on a line segment A-A' (a line segment that perpendicularly divides each of the first photodetector 21 and the second photodetector 22 into two equal parts in the x-direction) illustrated in FIGS. 1 and 3, and such that mirror inversion is generated only in the effective reflectance or the effective transmittance of the two-row modulation code pattern in relation to a line segment B-B' that perpendicularly divides a predetermined zone Lgray (the predetermined zone where the effective reflectance or the effective transmittance is gradually increased or decreased) of FIG. 1 into two equal parts.

The configurations of the gray tracks 51 and 52 and the disposition states of the first photodetector 21, the second photodetector 22, and the gray tracks 51 and 52, which are used to detect the effective reflectance or the effective transmittance of the optical pattern on the scale 4 in reverse phase, are referred to as a "disposition/configuration used to detect the effective reflectance or the effective transmittance of the gray scale pattern in reverse phase".

The "gray scale pattern is disposed and configured such that the effective reflectance or the effective transmittance is detected in reverse phase" means, in particular, that "the scale 4 and the first photodetector 21 are disposed such that one of the effective reflectance, the effective transmittance, and the diffraction efficiency of the gray scale pattern is detected according to characteristics of being gradually increased or decreased in the predetermined zone in the predetermined direction, and the scale 4 and the second photodetector 22 are disposed such that one of the effective reflectance, the effective transmittance, and the diffraction efficiency of the gray scale pattern is detected according to characteristics of being gradually decreased or increased in the predetermined zone in the predetermined direction unlike the first photodetector 21".

Processing in which the encode pattern formed on the scale 4 or an optical characteristic of the encode pattern in the modulation code pattern is utilized will be described below.

Although various optical image generation principles can be applied to the first embodiment, the case in which a detection principle by the triple-lattice configuration is utilized will be described as a typical example.

As illustrated in FIG. 2, it is assumed that z1 is a distance between the light source 1 and the encode pattern on the scale 4, z2 is a distance between the encode pattern on the scale 4 and the light receiving surfaces of the first photodetector 21 and the second photodetector 22, po is a pitch in the x-direction of the slit on the light source 1, and ps is a pitch of the encode pattern on the scale 4.

When the encode pattern having the period ps is irradiated with the light beam, which is emitted from the light source 1 through the slit having the period po, the light beam is reflected by the encode pattern and incident to the first photodetector 21 and the second photodetector 22, and a periodic optical pattern having a spatial period pi is formed on the light receiving surfaces of the first photodetector 21 and the second photodetector 22.

At this point, pi, po, ps, z1, and z2 satisfy the following relationships.

$$pi = ps \cdot (z1+z2)/z1 \quad \text{(expression 1)}$$

$$po = ps \cdot (z1+z2)/z2 \quad \text{(expression 2)}$$

In order to clearly form the periodic optical pattern having the spatial period pi, pi, ps, po, z1, and z2 and a wavelength λ of the light source 1 are configured to be matched with a condition that the optical image is formed by the triple-lattice configuration.

However, as described above, in the first embodiment, the optical image generation principle is not limited to the optical image forming principle by the triple-lattice configuration. When another image forming principle is used, no need to be matched with the forming condition is required.

In the first photodetector 21 and the second photodetector 22, the light receiving element arrays of four groups are formed with a pitch corresponding to the spatial period pi of the optical pattern, and the groups are disposed while deviated from each other by pi/4 in a spatial period direction.

Figure 4A:
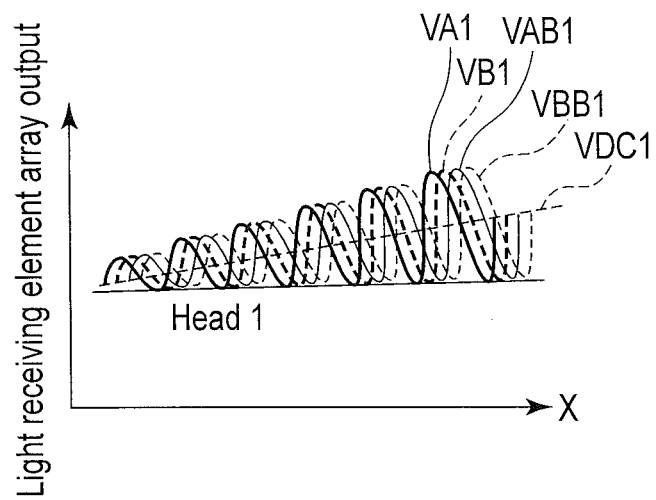
FIG. 4A is a view illustrating examples of signals that are output from four groups of the light receiving element arrays mounted on the first photodetector when a target is displaced in an X-direction.
Figure 4B:
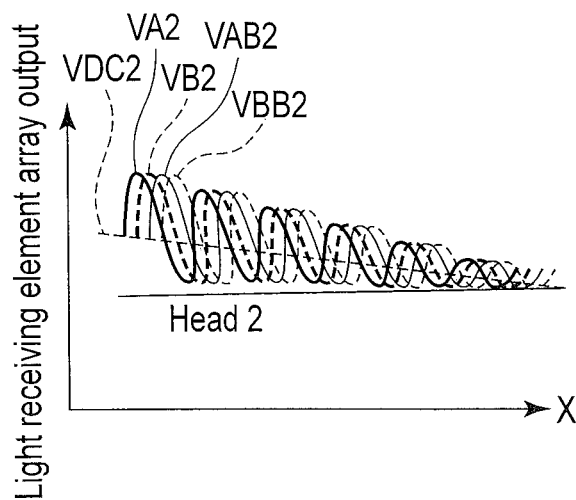
FIG. 4B is a view illustrating examples of signals that are output from four groups of the light receiving element arrays mounted on the second photodetector when a target is displaced in an X-direction.

FIG. 4A is a view illustrating examples of the signals that are output from the four groups of the light receiving element arrays mounted on the first photodetector 21. FIG. 4B is a view illustrating examples of the signals that are output from four groups of the light receiving element arrays mounted on the second photodetector 22.

As illustrated in FIG. 3, the output from the light receiving element array mounted on the first photodetector 21 is deviated by a quarter period relative to the optical image. Assuming that VA1, VB1, VAB1, and VBB1 are output terminals of the light receiving element arrays mounted on the first photodetector 21, when the displacement detection target is displaced in the x-direction, periodic signals are output from the output terminals VA1, VB1, VAB1, and VBB1 while deviated from each other by 90 degrees (that is, the quarter period). The same holds true for the periodic signals output from the output terminals of the light receiving element arrays mounted on the second photodetector 22.

The modulation code pattern differs from the encode pattern in that the characteristic in which the effective reflectance or the effective transmittance is gradually increased or decreased is superposed. Accordingly, when the modulation code pattern is applied, the periodic signals, which are deviated from each other by 90 degrees (that is, the quarter period), and in which the DC level and/or the amplitude is gradually increased or decreased with displacement of the displacement detection target in x-direction, are output from the output terminals of the light receiving element arrays with the pitch corresponding to the displacement amount ps.

In the gray track 51 and the gray track 52, the modulation code pattern is disposed such that the effective reflectances or the effective transmittances of the modulation code patterns disposed in the gray tracks 51 and 52 are detected in reverse phase from the output terminals of the light receiving element arrays of the two photodetectors (the first photodetector 21 and the second photodetector 22).

Accordingly, as illustrated in FIGS. 4A and 4B, characteristics in which the DC level or the amplitude is gradually increased (see FIG. 4A) or decreased (see FIG. 4B) are output as the reverse phase from the output terminals of the light receiving element arrays of the first photodetector 21 and the output terminals of the light receiving element arrays of the second photodetector 22.

Therefore, the outputs of the groups of light receiving element arrays of the first photodetector 21 have the characteristics indicated by VA1, VB1, VAB1, and VBB1 of FIG. 4B, and the DC level has the characteristic indicated by VDC1. On the other hand, the outputs of the groups of light receiving element arrays of the second photodetector 22 have the characteristics indicated by VA2, VB2, VAB2, and VBB2 of FIG. 4B, and the DC level has the characteristic indicated by VDC2.

Figure 5:
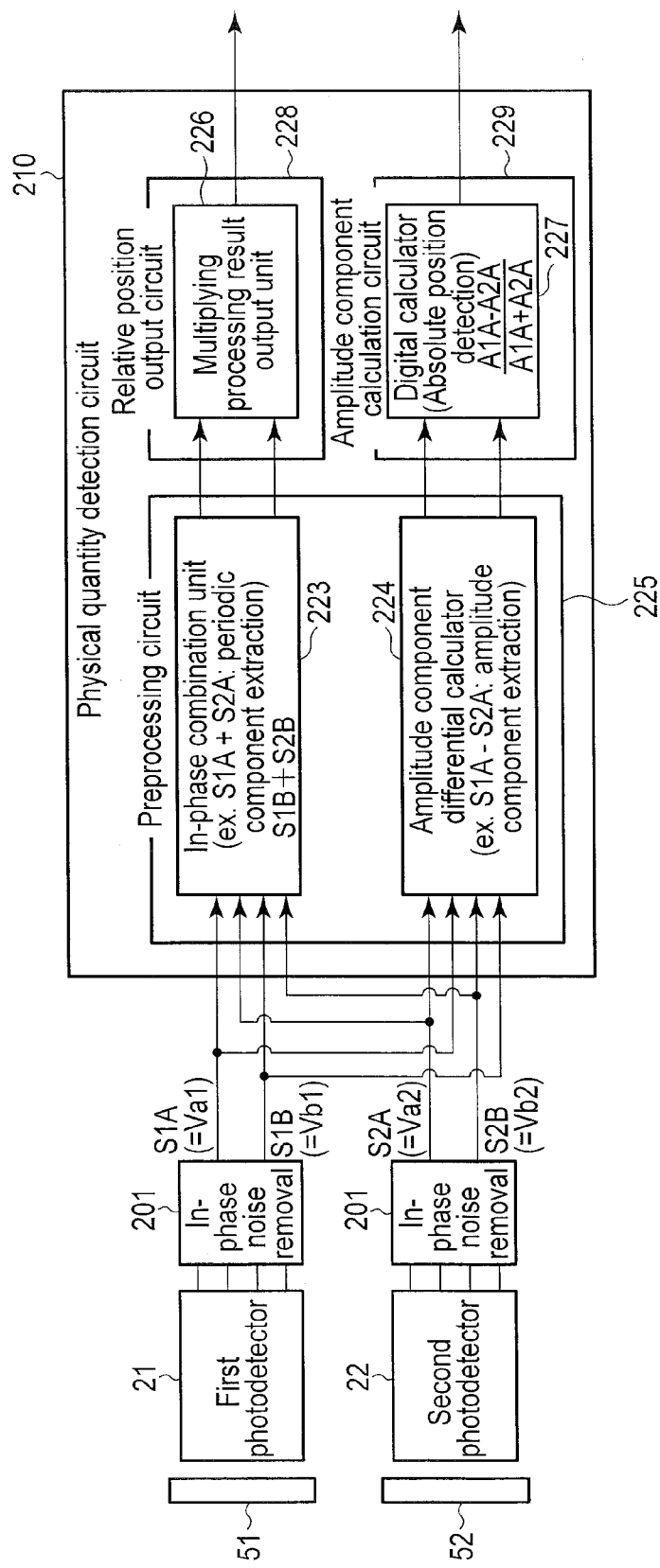
FIG. 5 is a view illustrating a configuration example of a physical quantity detection circuit that performs signal processing in the optical displacement detection apparatus of the first embodiment.

FIG. 5 is a view illustrating a configuration example of a physical quantity detection circuit that performs the signal processing.

A configuration example of the physical quantity detection circuit, a flow of signal processing performed by the physical quantity detection circuit, and signal processing will specifically be described below.

The physical quantity detection circuit 210 includes a preprocessing circuit 225 that performs predetermined preprocessing, a relative position output circuit 228 that outputs phase information in a period, and an amplitude component calculation circuit 229 that outputs amplitude information. The preprocessing circuit 225 includes an in-phase combination unit 223 and an amplitude component differential calculator 224.

An in-phase noise component of the output signals from each of the first photodetector 21 and the second photodetector 22 is removed by an in-phase noise removing unit 201, before the output signals are input to the physical quantity detection circuit 210. In the output signals from the first photodetector 21 and the second photodetector 22, the in-phase noise removing unit 201 performs subtract processing to the outputs from the output terminals whose phases are different from each other by a half period (180 degrees), and generates two sets of signals having phase difference of 90 degrees (that is, the quarter period) as illustrated in FIGS. 6A and 6B. Then the two sets of signals are input to the physical quantity detection circuit 210.

In the signals, in which the first photodetector 21 and the second photodetector 22 each receive the light beams reflected from the gray tracks 51 and 52 and output light receiving amounts as voltage values, the in-phase noise component is removed by the in-phase noise removing unit 201.

As described above, the signal output from the first photodetector 21 is processed by the in-phase noise removing unit 201, and output as two-phase amplitude modulation signals S1A and S1B (correspond to Va1 and Vb1 described later) having the 90-degree phase difference in a predetermined period. Similarly, as illustrated in FIG. 6B, the signal output from the second photodetector 22 is processed by the in-phase noise removing unit 201, and output as two-phase amplitude modulation signals S2A and S2B (correspond to Va2 and Vb2 described later) having the 90-degree phase difference in a predetermined period.

It is not always necessary that the two-phase amplitude modulation signals output from the first photodetector 21 and the second photodetector 22 each have the 90-degree phase difference.

The amplitude modulation signals S1A, S1B, S2A, and S2B are each input to both the in-phase combination unit 223 and the amplitude component differential calculator 224 in the preprocessing circuit 225.

A method for stably and highly accurately detecting an absolute displacement and a relative displacement of the target will be described below.

<<Absolute Displacement Detection Processing>>

A method for detecting the absolute displacement of the target will be described.

The amplitude component differential calculator 224 performs calculation processing (difference: AC1, sum: AC2) of the amplitude components based on an amplitude component A1A of S1A and an amplitude component A2A of S2A.

That is, the amplitude component differential calculator 224 calculates the following expressions.

$$AC1 = A1A - A2A \quad \text{(expression 3)}$$

$$AC2 = A1A + A2A \quad \text{(expression 4)}$$

The amplitude component calculation circuit 229 includes a digital calculator 227 that calculates and outputs the absolute position. Based on the calculation results of (expression 3) and (expression 4), the digital calculator 227 calculates the following expression to obtain and output the absolute position.

$$AC1/AC2 \quad \text{(expression 5)}$$

More particularly, an absolute position X is calculated by the following calculation in which the calculation result of (expression 5) is used.

$$X = \alpha \cdot AC1/AC2 + \beta \quad \text{(expression 6)}$$

where $\alpha(\neq 0)$ and $\beta$ are coefficients.

Because the conversion of (expression 5) into (expression 6) is easily performed to calculate the absolute position X, it is not always necessary to perform the calculation in the digital calculator 227. In such cases, for example, a host computer in a subsequent stage may perform the conversion using (expression 6).

In the above example, the method in which the amplitude components A1A and A2A are used is described as the absolute displacement detecting method. Intrinsically, any signal that is differentially detected in reverse phase may be used. For example, the pieces of processing of (expression 3) to (expression 6) may be performed using VDC1 and VDC2 that are of the DC-level signals in FIGS. 4A and 4B instead of A1A and A2A.

The processing of calculating the absolute displacement x will be described in detail.

Figure 7:
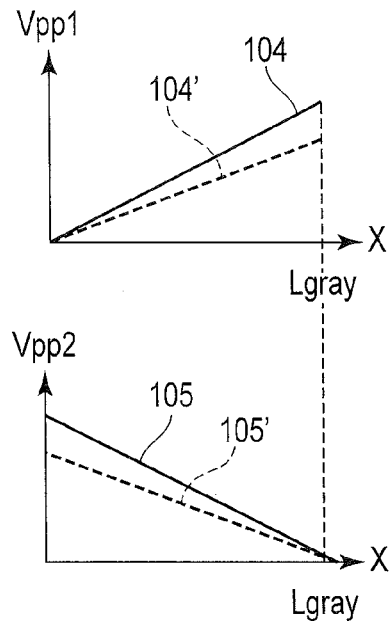
FIG. 7 is a view illustrating characteristics of Vpp1 and Vpp2.

When the amplitudes of the output signals Va1 and Vb1 illustrated in FIG. 6A are calculated, a signal 104 that is monotonously increased can be obtained as illustrated in FIG. 7. It is assumed that Vpp1 is the signal output. When the amplitudes of the output signals Va2 and Vb2 illustrated in FIG. 6B are calculated, a signal 105 that is monotonously decreased can be obtained as illustrated in FIG. 7. It is assumed that Vpp2 is the signal output.

Vpp1 and Vpp2 are expressed as follows.

$$Vpp1 = a \cdot x \quad \text{(expression 7)}$$

$$Vpp2 = -a \cdot (x - L\text{gray}) \quad \text{(expression 8)}$$

Lgray is a length of a predetermined zone where the reflectance or the transmittance of the scale 4 is gradually increased. Assuming that Vppmax is a maximum amplitude in the zone Lgray, a gradient a that is of a proportionality coefficient indicates that the amplitude is increased relative to the absolute displacement x. Generally the gradient a depends on the displacement x. However, when the effective reflectance or the effective transmittance of the gray scale pattern is configured to be linearly changed relative to the displacement x, the gradient a is kept constant, and expressed by the following expression.

$$a = Vpp\text{max}/L\text{gray} \quad \text{(expression 9)}$$

The sum and the difference of Vpp1 and Vpp2 are calculated as follows.

$$Vpp1 + Vpp2 = a \cdot L\text{gray} \quad \text{(expression 10)}$$

$$Vpp1 - Vpp2 = 2a \cdot x - a \cdot L\text{gray} \quad \text{(expression 11)}$$

Figure 8:
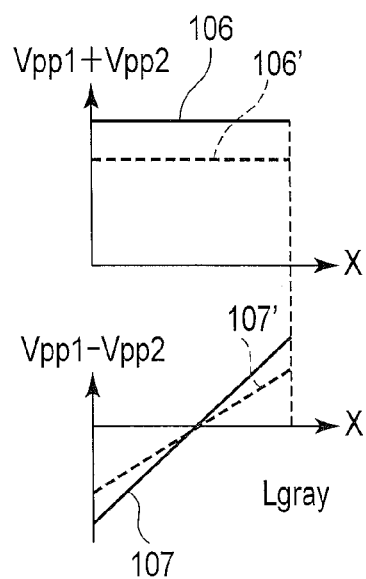
FIG. 8 is a view illustrating characteristics of (Vpp1+Vpp2) and (Vpp1−Vpp2).

FIG. 8 is a view illustrating (expression 10) and (expression 11).

After Vpp1 and Vpp2 are obtained, Vpp1+Vpp2, Vpp1−Vpp2, and a ratio are calculated. The characteristic illustrated in FIG. 8 can be obtained by the calculation.

That is, when (expression 12) is solved in terms of x, (expression 13) is obtained.

$$(Vpp1 - Vpp2)/(Vpp1 + Vpp2) = 2/L\text{gray} \cdot x - 1 \quad \text{(expression 12)}$$

$$x = L\text{gray} \cdot ((Vpp1 - Vpp2)/(Vpp1 + Vpp2) + 1)/2 \quad \text{(expression 13)}$$

At this point, (Vpp1−Vpp2)/(Vpp1+Vpp2) does not depend on the maximum amplitude Vppmax or the gradient a. Accordingly, it is not necessary to previously obtain the value of the maximum amplitude Vppmax or the gradient a, or the absolute displacement x can stably be detected even if the value of the maximum amplitude Vppmax or the gradient a varies.

At this point, desirably the proportionality coefficient a described in (expression 7) and (expression 8) is a constant value in calculating the absolute displacement. Therefore, desirably "the gray scale pattern is formed such that the increases or decreases of one of the effective reflectance, the effective transmittance, and the diffraction efficiency of the gray scale pattern, which are detected by the first photodetector 21 and the second photodetector 22, are substantially linearly changed in opposite directions to each other, and such that the sum of one of the effective reflectance, the effective transmittance, and the diffraction efficiency of the gray scale pattern detected by the first photodetector 21 and one of the effective reflectance, the effective transmittance, and the diffraction efficiency of the gray scale pattern detected by the second photodetector 22 is substantially kept constant".

Effectiveness of the above series of processing will be described.

When a change with time of the sensor or a change in environmental temperature is generated, usually, for instance, the output from the light source or the sensitivity characteristic of the photodetector is changed. Even if the output from the light source or the sensitivity characteristic of the photodetector is not changed, a light quantity detected by the photodetector is changed due to backlash of the sensor head or the scale or the like.

As illustrated in FIGS. 7 and 8, the output amplitude from the sensor head or the sum or difference component of the output amplitudes varies largely by various variation factors, for example, from the characteristic indicated by a solid line 104 to the characteristic indicated by a broken line 104', from the characteristic indicated by a solid line 105 to the characteristic indicated by a broken line 105', from the characteristic indicated by a solid line 106 to the characteristic indicated by a broken line 106', and from the characteristic indicated by a solid line 107 to the characteristic indicated by a broken line 107'. Accordingly, the absolute position cannot accurately be detected by utilizing the characteristics illustrated in FIGS. 7 and 8.

Additionally, the positional information cannot be calculated unless the value of the maximum amplitude Vppmax or the gradient a is obtained at least once. This means that, in (expression 7) to (expression 11), the value of the maximum amplitude Vppmax or the gradient a is changed by various variation factors and that the absolute displacement cannot be calculated unless the maximum amplitude Vppmax or the gradient a is obtained beforehand.

In the first embodiment, after the sum and difference of Vpp1 and Vpp2 are calculated, the ratio of Vpp1 and Vpp2 is further calculated, thereby obtaining a characteristic in which the gradient a and the maximum amplitude Vppmax, which are of the variation component, are cancelled as illustrated in (expression 12) and (expression 13). Therefore, the absolute displacement x can stably and highly accurately be detected.

Figure 9:
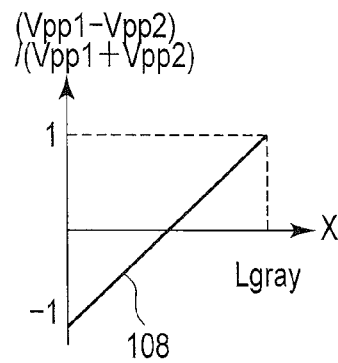
FIG. 9 is a view illustrating characteristics of a ratio of (Vpp1+Vpp2) and (Vpp1−Vpp2).

That is, in the optical displacement detection apparatus of the first embodiment, although the variation in characteristic generated by the variation factors is seen in the signal processing stage illustrated in FIGS. 7 and 8, by calculating the ratio of the sum and difference of Vpp1 and Vpp2, the variation factors can be cancelled to obtain stable sensor characteristic as illustrated in FIG. 9.

Because the characteristic illustrated in FIG. 9 does not depend on the gradient a and the maximum amplitude Vppmax, it is not necessary to obtain the gradient a and the maximum amplitude Vppmax. Accordingly, advantageously no necessity of an initial setting of the sensor is required.

<<Relative Displacement Detection Processing>>

According to the optical displacement detection apparatus of the first embodiment, also the relative displacement can highly accurately be detected by the following processing method.

The in-phase combination unit 223 extracts the periodic components of the amplitude modulation signals output from the first photodetector 21 and the second photodetector 22, and combines the periodic components in each in-phase signal.

That is, the in-phase combination unit 223 calculates the following expressions.

$$S3A = S1A + S2A = Va1 + Va2 \quad \text{(expression 14)}$$

$$S3B = S1B + S2B = Vb1 + Vb2 \quad \text{(expression 15)}$$

The relative position output circuit 228 includes a multiplying processing result output unit 226 that calculates and outputs the relative position. Based on a phase angle of the periodic component extracted by the in-phase combination unit 223, the multiplying processing result output unit 226 converts the displacement into angle information and compares the converted angle information to the last calculation processing result, thereby calculating the displacement amount according to resolution.

In performing the multiplying processing, the multiplying processing result output unit 226 may adopt a processing technique of directly calculating the amplitude value to convert the amplitude value into the angle information, or a processing technique of what is called a ROM table referring method.

The relative displacement can also be detected based on the Lissajous figure generated from the amplitude modulation signal. The detailed description will be made below.

<Relative Displacement Detection Processing Based on Lissajous Figure>

The two sets of signals each having the phase difference of the quarter period illustrated in FIGS. 6A and 6B are added in each in-phase signal. As described above, in the gray tracks 51 and 52, because the modulation code pattern is disposed such that the effective reflectance or the effective transmittance is detected in reverse phase, the signals having the phase difference of the quarter period can be obtained, and the signals have the substantially constant amplitude relative to the displacement X as illustrated by Va and Vb of FIG. 10. The signal can be converted into the highly-accurate relative position signal by utilizing a signal processing method of an encoder having a usual encode pattern.

Figure 10:
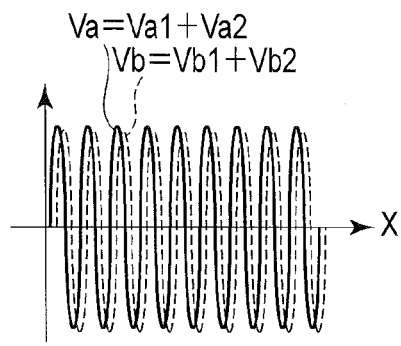
FIG. 10 is a view illustrating examples of Va and Vb.
Figure 11:
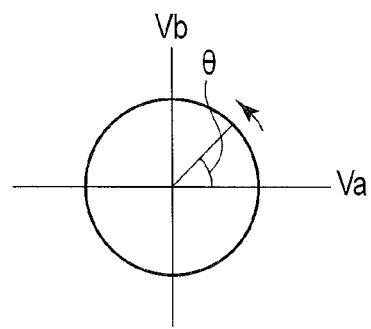
FIG. 11 is a view illustrating an example of a Lissajous figure that is used in relative displacement detection processing.

For example, when the signal of FIG. 10 is displayed as the Lissajous figure, a circle having a constant radius is drawn as illustrated in FIG. 11. A phase angle θ on a circumference corresponds to the displacement in the period ps.

Assuming that xp is the relative displacement in the period ps, the following expression is obtained.

$$xp = ps \cdot \theta/2\pi \qquad \text{(expression 16)}$$

Accordingly, the displacement amount finer than the period ps can be detected by finely calculating the phase angle θ.

The relative displacement can highly accurately be detected by utilizing counter information in which the number of rotations of the Lissajous figure is recorded in conjunction with a relative displacement xp.

The relative displacement xp expressed by (expression 16) can also be calculated by utilizing the amplitude modulation signals output from the first photodetector 21 and the second photodetector 22 of FIGS. 6A and 6B. However, in this case, the amplitude varies according to the relative displacement xp (the radius of the Lissajous figure varies). Accordingly, a detection error is increased in the area of the small amplitude, and the relative position cannot stably and highly accurately be detected over the whole predetermined zone.

On the other hand, in the first embodiment, "after the two sets of amplitude modulation signals output from the first photodetector 21 and the second photodetector 22 are added in each in-phase signal, the phase angle on the Lissajous figure is detected", which allows the position to be stably and highly accurately detected irrespective of the site in the predetermined zone.

The absolute displacement can also be detected based on the Lissajous figure generated from the amplitude modulation signal. The detailed description will be made below.

<<Example of Absolute Displacement Detection Processing Based on Lissajous Figure>>

Figure 12:
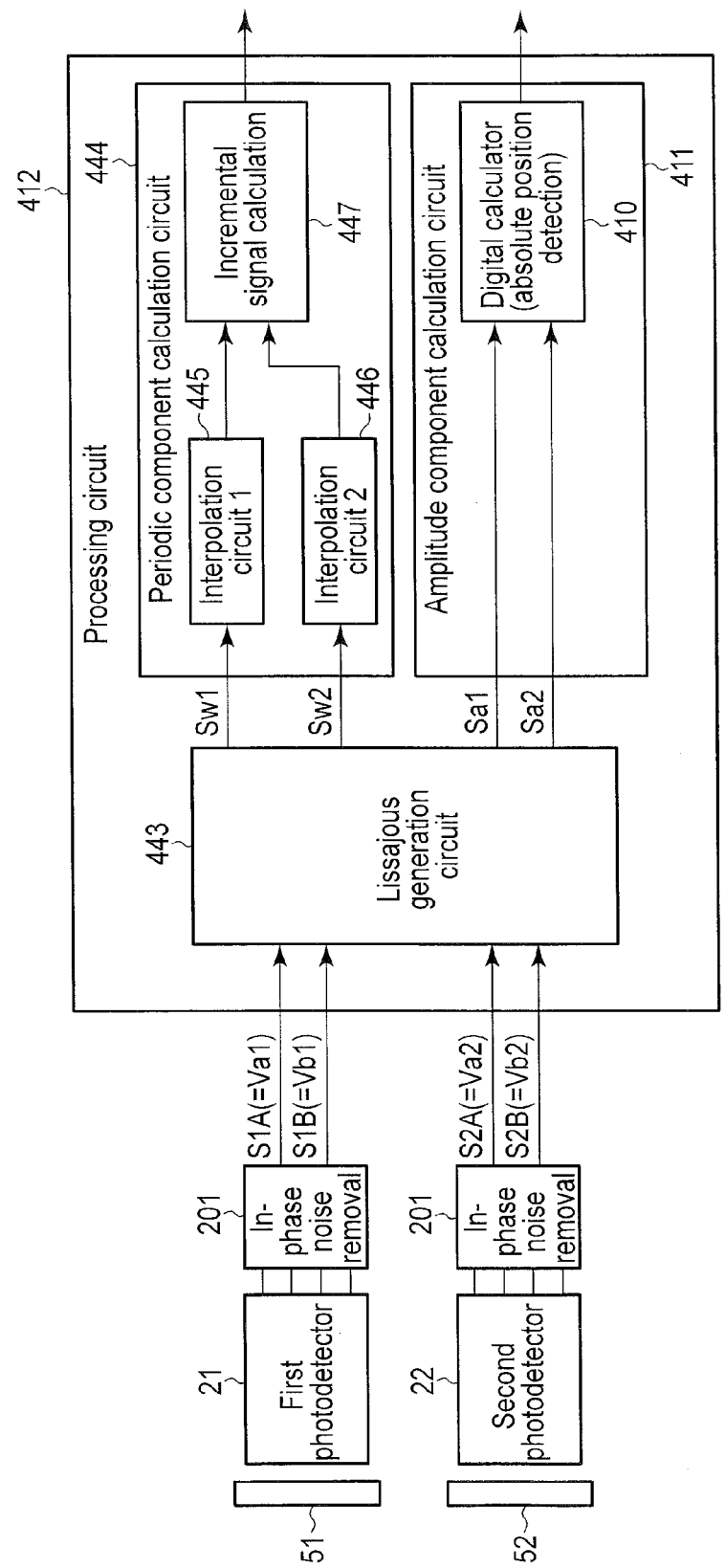
FIG. 12 is a view illustrating a configuration example of the physical quantity detection circuit.

FIG. 12 is a view illustrating a configuration example of a physical quantity detection circuit in an example of the absolute displacement detection processing based on the Lissajous figure.

As illustrated in FIG. 12, a physical quantity detection circuit 412 includes a Lissajous generation circuit 443 that generates a periodic component signal and an amplitude component signal, a periodic component calculation circuit 444 that outputs the relative displacement, and an amplitude component calculation circuit 411 that outputs the absolute displacement.

The Lissajous generation circuit 443 generates a periodic component signal Sw1 based on the amplitude modulation signals S1A and S1B input from the first photodetector 21, and generates a periodic component signal Sw2 based on the amplitude modulation signals S2A and S2B input from the second photodetector 22.

The Lissajous generation circuit 443 further generates an amplitude component signal Sa1 based on the amplitude modulation signals S1A and S1B input from the first photodetector 21, and generates an amplitude component signal Sa2 based on the amplitude modulation signals S2A and S2B input from the second photodetector 22.

At this point, the amplitude modulation signals S1A (cos component) and S1B (sin component) from the first photodetector 21 and the amplitude modulation signals S2A (cos component) and S2B (sin component) from the second photodetector 22 are periodic signals having a constant phase difference and the period p. The Lissajous figure based on each amplitude modulation signal draws a spiral locus as illustrated in FIG. 13.

In FIG. 13, a Lissajous figure L1 illustrated by a bold line is the Lissajous figure based on the amplitude modulation signals S1A (cos component) and S1B (sin component) from the first photodetector 21. A Lissajous figure L2 illustrated by a thin line is the Lissajous figure based on the amplitude modulation signals S2A (cos component) and S2B (sin component) from the second photodetector 22.

The periodic component calculation circuit 444 includes a first interpolation circuit 445, a second interpolation circuit 446, and an incremental signal arithmetic circuit 447.

The first interpolation circuit 445 and the second interpolation circuit 446 convert the input periodic component signals Sw1 and Sw2 into the pieces of angle information.

Specifically, the first interpolation circuit 445 and the second interpolation circuit 446 can acquire the pieces of angle information by directly calculating arctan from two-phase values of cos and sin output from the Lissajous generation circuit 443. Alternatively, address data is generated by performing analog-digital conversion of the signal output from the Lissajous generation circuit 443, and interpolation processing may be performed by referring to the angle information previously recorded in a storage area based on the address data. Depending on the resolution, a simple circuit element such as a comparator may detect the signal using a direct analog value and obtain the displacement.

The incremental signal arithmetic circuit 447 removes an error component by performing calculation processing to the pieces of angle information input from the first interpolation circuit 445 and the second interpolation circuit 446, and, moreover, calculates a difference with the angle information acquired in the last timing and calculates and outputs the amount of change.

As used herein, "the error component is removed" means not only an average value of the pieces of angle information output from the interpolation circuits 445 and 446 is simply calculated, but also an error of the angle information caused by the amplitude variations of the original signals S1A, S1B, S2A, and S2B is reduced by the following processing. For example, the following three examples can be cited as a processing method for removing the error component.

Example 1

Only the pieces of angle information corresponding to the large amplitude of the original signal are output from the interpolation circuits 445 and 446 (which can be applied when the amplitude variation exists in the processing performed by the Lissajous generation circuit 443, or when the amplitude variation is not eliminated).

Example 2

Average processing is performed by weighting the pieces of angle information from the interpolation circuits 445 and 446 according to the magnitude of the amplitude of the original signal.

Example 3

The error is removed at the beginning of processing.

The amplitude component calculation circuit 411 includes a digital calculator 410 that calculates the absolute displacement relative to the reference value and outputs the absolute displacement.

The digital calculator 410 calculates the absolute displacement by performing the following calculation to radiuses r1 and r2 of the Lissajous figure output from the Lissajous generation circuit 443.

That is, the absolute displacement is calculated from the following expression.

$$(r1-r2)/(r1+r2) \quad \text{(expression 17)}$$

The absolute displacement is also obtained by dividing the difference of the radiuses by the maximum value of the output signal.

That is, the absolute displacement may be calculated from the following expression.

$$(r1-r2)/r\max \quad \text{(expression 18)}$$

In the calculation of the absolute position, after the amplitude component calculation circuit 411 coarsely calculates the absolute position, the absolute position can highly accurately be obtained from information in which the coarse absolute position and the relative position output from the periodic component calculation circuit 444 are combined.

A simple circuit element such as a comparator can detect signals to make a comparison determination, and the absolute position may be calculated based on the direct analog value.

In the first embodiment, "the optical pattern in which the effective reflectance or the effective transmittance is gradually increased or decreased" is not limited to the simple gradual increase or decrease of the reflectance or the transmittance of the pattern. The optical pattern in this context includes all the patterns in which the light beam with which the scale is irradiated is reflected, transmitted, and diffracted by the optical pattern on the scale to modulate the spatial amplitude or the total light quantity of the optical image formed on the light receiving surface of the photodetector.

As described above, the first embodiment can provide the optical displacement detection apparatus in which the improvement of the detection sensitivity of the absolute position and the enlarged detection range are implemented while the resolution and the stability are maintained at a high level in both the absolute position detection and the relative position detection.

Additionally, according to the configuration of the optical displacement detection apparatus of the first embodiment, the plural photodetectors and the light source are integrated into one sensor head, a gap between the parallel gray tracks can be narrowed, the sensor head is miniaturized as a whole, and furthermore, an alignment between the sensor head and the scale is easy to perform.

The number of light sources 1 is not limited to one. That is, the plural light source may be provided. The number of sensor heads is not limited to one. That is, the plural sensor heads may be provided.

For example, the light source and the sensor head may separately be provided in each of the two gray tracks. In this configuration, a degree of freedom of the distance disposition between the gray tracks is increased because a different light source can be used in each of gray track and the sensor head. When the high-accuracy detection is required while a difference in light quantity between the two light sources exists, desirably the difference in light quantity is corrected.

The first embodiment described above is not limited to the above examples, and various modifications and applications can be made without departing from the scope of the first embodiment.

Modifications of the optical displacement detection apparatus of the first embodiment will be described below.

[First Modification]

A first modification relates to the configuration of the optical pattern formed on the scale 4. FIG. 14 is a perspective view illustrating a configuration example of a modulation code pattern unique to an optical displacement detection apparatus according to the first modification.

As illustrated in FIG. 14, a modulation code pattern 150 is configured while an encode pattern 157 and a wedge-shape pattern 155 are combined. The encode pattern 157 is finer than a light beam area 111, and extends in a predetermined direction (the X-direction that is of the direction in which the displacement is detected). The pattern in which the effective reflectance is linearly and gradually increased or decreased can easily be produced by adopting the configuration of the first modification.

[Second Modification]

A second modification relates to the configuration of the optical pattern formed on the scale 4. FIG. 15 is a perspective view illustrating a configuration example of a modulation code pattern unique to an optical displacement detection apparatus according to the second modification.

As illustrated in FIG. 15, the modulation code pattern 150 is configured while a member in which the encode pattern 157 is formed and a member in which the wedge-shape pattern 155 is formed are stacked. The encode pattern 157 is finer than the light beam area 111, and extends in the predetermined direction (the X-direction that is of the direction in which the displacement is detected). The pattern in which the effective reflectance is linearly and gradually increased or decreased can easily be produced by adopting the configuration of the second modification.

[Third Modification]

In an optical displacement detection apparatus according to a third modification, instead of providing the modulation code pattern on the scale 4, a "modulation gray scale pattern" that exerts the same function as the modulation code pattern by the change in geometrical distance between the photodetectors 21 and 22 is provided while integrated with the scale 4.

FIGS. 16A and 16B are sectional views illustrating a configuration example of a scale 4 in which the modulation gray scale pattern is provided. Particularly, FIG. 16A is a sectional view taken on the line segment B-B' of FIG. 1, and FIG. 16B is a sectional view taken on the line segment C-C' of FIG. 1

As illustrated in FIGS. 16A and 16B, a modulation gray scale pattern 150' in which the optical patterns 53 are provided at predetermined intervals in the predetermined direction (the x-direction that is of the direction in which the displacement is detected) is formed on the surface facing the sensor head 30 of the scale 4.

At this point, the scale 4 is configured such that a thickness of the scale 4 is gradually increased toward the X-direction in the B-B' section and such that the thickness of the scale 4 is gradually decreased toward the X-direction in the C-C' section. The scale 4 is configured such that the sum of the thickness in the B-B' section and the thickness in the C-C' section is kept constant.

In the configuration of the third modification, the geometric distance between the scale 4 and the sensor head 30 is gradually changed, and the changing effective reflectances of the two modulation gray scale patterns can be detected in reverse phase.

[Fourth Modification]

In an optical displacement detection apparatus according to a fourth modification, instead of providing the modulation code pattern on the scale 4, the "modulation gray scale pattern" that exerts the same function as the modulation code pattern by the change in optical distance between the photodetectors 21 and 22 is provided while integrated with the scale 4.

FIGS. 17A and 17B are sectional views illustrating a configuration example of a scale 4 in which the modulation gray scale pattern is provided. Particularly, FIG. 17A is a sectional view taken on the line segment B-B' of FIG. 1, and FIG. 17B is a sectional view taken on the line segment C-C' of FIG. 1

As illustrated in FIGS. 17A and 17B, the modulation gray scale pattern 150' in which the optical patterns 53 are provided at predetermined intervals in the predetermined direction (the x-direction that is of the direction in which the displacement is detected) is formed on the opposite surface to the surface facing the sensor head 30 in the scale 4 that is of a transparent member.

At this point, the scale 4 is configured such that the thickness of the scale 4 is gradually increased toward the X-direction in the B-B' section and such that the thickness of the scale 4 is gradually decreased toward the X-direction in the C-C' section. The scale 4 is configured such that the sum of the thickness in the B-B' section and the thickness in the C-C' section is kept constant.

An optical distance in the scale 4 that is of the transparent member is different from an optical distance in air. Although the geometric distance between the light source 1 and each optical pattern 53 constituting the modulation gray scale pattern 150' is equal, the optical distance is different (the optical distance is gradually increased or decreased in the x-direction by the above configuration).

Accordingly, in the above configuration of the fourth modification, the optical distance between the scale 4 and the sensor head 30 is gradually changed, and the changing effective reflectances of the two modulation gray scale patterns can be detected in reverse phase.

[Fifth Modification]

In an optical displacement detection apparatus according to a fifth modification, instead of providing the gray track on the scale, the "modulation gray scale pattern" that exerts the same function as the gray track by the later-described configuration is provided on the scale.

Figure 18B:
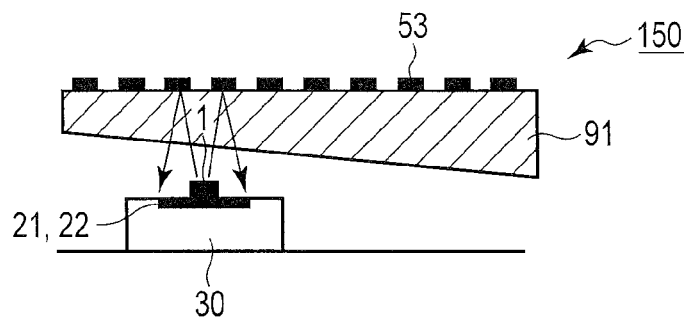
FIG. 18B is a sectional view illustrating a configuration example of the scale in which the modulation code pattern of the fifth modification is provided.

FIGS. 18A and 18B are sectional views illustrating a configuration example of a scale 4 in which the modulation gray scale pattern is provided. Particularly, FIG. 18A is a sectional view taken on the line segment B-B' of FIG. 1, and FIG. 18B is a sectional view taken on the line segment C-C' of FIG. 1.

As illustrated in FIGS. 18A and 18B, the modulation gray scale pattern 150' in which the optical patterns 53 are provided at predetermined intervals in a longitudinal direction of the scale 4 is formed on the opposite surface to the surface facing the sensor head 30 in the scale 4 having a predetermined transmittance.

At this point, the scale 4 is configured such that the thickness of the scale 4 is gradually increased toward the X-direction in the B-B' section and such that the thickness of the scale 4 is gradually decreased toward the X-direction in the C-C' section. The scale 4 is configured such that the sum of the thickness in the B-B' section and the thickness in the C-C' section is kept constant.

Accordingly, in the above configuration of the fifth modification, the transmittance between the optical pattern 53 and the sensor head 30 is gradually changed, and the changing effective reflectances of the two modulation gray scale patterns can be detected in reverse phase.

[Sixth Modification]

Figure 19:
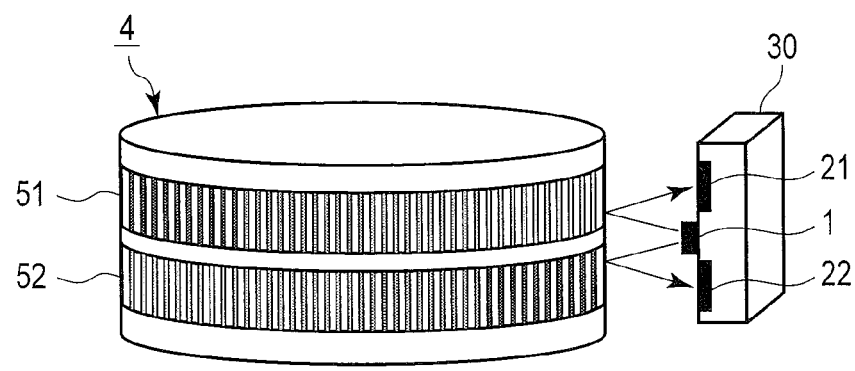
FIG. 19 is a perspective view illustrating a configuration example of a scale and a sensor head, which are unique to an optical displacement detection apparatus according to a sixth modification.

A sixth modification relates to the configuration (shape) of the scale 4. FIG. 19 is a perspective view illustrating a configuration example of a scale and a sensor head, which are unique to an optical displacement detection apparatus according to the sixth modification.

As illustrated in FIG. 19, in the optical displacement detection apparatus of the sixth modification, the scale 4 is formed into a cylindrical shape. The gray track 51 and the gray track 52 are provided in parallel to each other in an outer circumferential surface of the cylindrical scale 4.

On the other hand, in the sensor head 30, the first photodetector 21 is provided according to the position in which the gray track 51 is provided in the scale 4, and the second photodetector 22 is provided according to the position in which the gray track 52 is provided. The light source 1 is provided between the first photodetector 21 and the second photodetector 22.

The gray track 51 and the gray track 52 are disposed and configured such that the first photodetector 21 and the second photodetector 22 detect the effective reflectances in reverse phase.

In the above configuration of the sixth modification, the changing effective reflectances of the two modulation code patterns can be detected in reverse phase.

According to the sixth modification, because the gray track is formed on the cylindrical scale 4, both the relative rotation angle and the absolute angle of the measurement target can highly accurately be detected.

[Seventh Modification]

In an optical displacement detection apparatus according to a seventh modification, instead of providing the modulation code pattern on the scale 4, the "modulation gray scale pattern" that exerts the same function as the modulation code pattern by the change in geometrical distance between the photodetectors 21 and 22 is provided while integrated with the scale 4.

In the optical displacement detection apparatus of the sixth modification, the scale 4 is formed into a cylindrical shape whose section is a circle. On the other hand, in the seventh modification, the scale 4 is formed into a cylindrical shape whose section is not the circle.

Figure 20A:
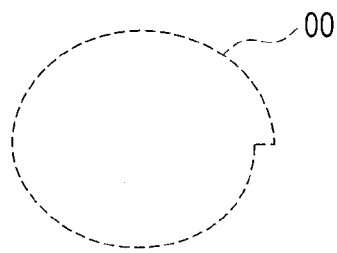
FIG. 20A is a sectional view illustrating a configuration example of a scale according to a seventh modification.

FIG. 20A is a sectional view illustrating the case in which the scale 4 is cut in the position in the outer circumferential surface in which the modulation gray scale pattern of the optical detection target of the first photodetector 21 is provided. FIG. 20B is a sectional view illustrating the case in which the scale 4 is cut in the position in the outer circumferential surface in which the modulation gray scale pattern of the optical detection target of the second photodetector 22 is provided.

As illustrated in FIGS. 20A and 20B, the section of the scale 4 is not the circular shape having the constant radius like the scale 4 of the sixth modification, but the section of the scale 4 has a shape in which the geometric distance between the scale 4 and the sensor head 30 is changed according to the rotation of the scale 4, namely, a substantially circular shape in which the radius is gradually increased or decreased.

Specifically, the scale 4 is configured into a sectional shape in which the radius is gradually increased such that the geometric distance between the scale 4 and the sensor head 30 is shortened according to the rotation of the scale 4 in the region in which the modulation gray scale pattern of the optical detection target of the first photodetector 21 is provided (see FIG. 20A).

On the other hand, the scale 4 is configured into a sectional shape in which the radius is gradually decreased such that the geometric distance between the scale 4 and the sensor head 30 is lengthened according to the rotation of the scale 4 in the region in which the modulation gray scale pattern of the optical detection target of the second photodetector 22 is provided (see FIG. 20B).

The scale 4 is configured such that the sum of the sectional radius in the region in which the modulation gray scale pattern of the optical detection target of the first photodetector 21 is provided and the sectional radius in the region in which the modulation gray scale pattern of the optical detection target of the second photodetector 22 is provided is kept constant.

In the above configuration of the seventh modification, the geometric distance between the scale 4 and the sensor head 30 is gradually changed, and the changing effective reflectances of the two modulation gray scale patterns can be detected in reverse phase.

[Eighth Modification]

In an optical displacement detection apparatus according to an eighth modification, instead of providing the modulation code pattern on the scale 4, the "modulation gray scale pattern" that exerts the same function as the modulation code pattern by the change in optical distance between the photodetectors 21 and 22 is provided while integrated with the scale 4.

In the eighth modification, as illustrated in FIGS. 21A and 21B, a transparent member 93 is provided in the outer circumferential surface of the scale 4 (having the cylindrical shape whose section is the circle) of the optical displacement detection apparatus of the sixth modification.

FIG. 21A is a sectional view illustrating the case in which the scale 4 is cut in a position in the outer circumferential surface in which the modulation gray scale pattern of the optical detection target of the first photodetector 21 is provided. FIG. 21B is a sectional view illustrating the case in which the scale 4 is cut in a position in the outer circumferential surface in which the modulation gray scale pattern of the optical detection target of the second photodetector 22 is provided. The optical patterns are provided in the circumferential surface (circumferential surface having an ellipsoidal shape) illustrated by a broken line 97 of FIGS. 21A and 21B.

Specifically, the transparent member 93 having the sectional shape whose radius is gradually decreased is provided in the scale 4 such that the optical distance between the optical pattern and the sensor head 30 is shortened according to the rotation of the scale 4 in the region in which the modulation gray scale pattern of the optical detection target of the first photodetector 21 is provided (see FIG. 21A). On the other hand, the transparent member 93 having the sectional shape whose radius is gradually increased is provided in the scale 4 such that the optical distance between the optical pattern and the sensor head 30 is lengthened according to the rotation of the scale 4 in the region in which the modulation gray scale pattern of the optical detection target of the second photodetector 22 is provided (see FIG. 21B).

The scale 4 is configured such that the sum of the sectional radius in the region in which the modulation gray scale pattern of the optical detection target of the first photodetector 21 is provided and the sectional radius in the region in which the modulation code pattern of the optical detection target of the second photodetector 22 is provided is kept constant.

An optical distance in the scale 4 that is of the transparent member is different from an optical distance in air. Although the geometric distance between the light source 1 and each optical pattern is equal, the optical distance is different (the optical distance is gradually increased or decreased by the above configuration).

Accordingly, in the above configuration of the eighth modification, the optical distance between the modulation gray scale pattern and the sensor head 30 is gradually changed, and the changing effective reflectances of the two modulation gray scale patterns can be detected in reverse phase.

[Ninth Modification]

In an optical displacement detection apparatus according to a ninth modification, instead of providing the modulation code pattern on the scale 4, the "modulation gray scale pattern" that exerts the same function as the modulation code pattern by the change in optical transmittance between the photodetectors 21 and 22 is provided while integrated with the scale 4.

In the ninth modification, the scale 4 of the optical displacement detection apparatus of the sixth modification is constructed by a member 91 having a predetermined transmittance. The modulation gray scale pattern is provided in the circumferential surface (circumferential surface having the ellipsoidal shape) illustrated by the broken line 97 of FIGS. 22A and 22B.

Figure 22B:
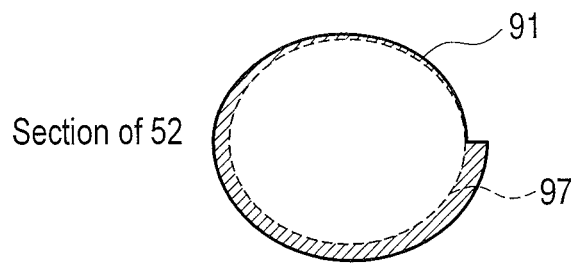
FIG. 22B is a sectional view illustrating a configuration example of the scale of the ninth modification.

FIG. 22A is a sectional view illustrating the case in which the scale 4 is cut in a region where the modulation gray scale pattern of the optical detection target of the first photodetector 21 is provided. FIG. 22B is a sectional view illustrating the case in which the scale 4 is cut in a region where the modulation gray scale pattern of the optical detection target of the second photodetector 22 is provided.

Specifically, the scale 4 is configured into a sectional shape in which the radius is gradually decreased such that the transmittance of the light from the light source 1 is gradually increased according to the rotation of the scale 4 in the region in which the modulation gray scale pattern of the optical detection target of the first photodetector 21 is provided (see FIG. 22A).

On the other hand, the scale 4 is configured into a sectional shape in which the radius is gradually increased such that the transmittance of the light from the light source 1 is gradually decreased according to the rotation of the scale 4 in the region in which the modulation gray scale pattern of the optical detection target of the second photodetector 22 is provided (see FIG. 22B).

The scale 4 is configured such that the sum of the sectional radius in the region in which the modulation gray scale pattern of the optical detection target of the first photodetector 21 is provided and the sectional radius in the region in which the modulation gray scale pattern of the optical detection target of the second photodetector 22 is provided is kept constant.

The optical distance in the scale 4 that is of the member having the predetermined transmittance is different from the optical distance in air. Although the geometric distance between the light source 1 and each optical pattern is equal, the optical distance is different (the optical distance is gradually increased or decreased by the above configuration).

Accordingly, in the above configuration of the ninth modification, the transmittance and the optical distance between the modulation gray scale pattern and the sensor head 30 are gradually changed, and the changing effective reflectances of the two modulation gray scale patterns can be detected in reverse phase.

[Tenth Modification]

Figure 23:
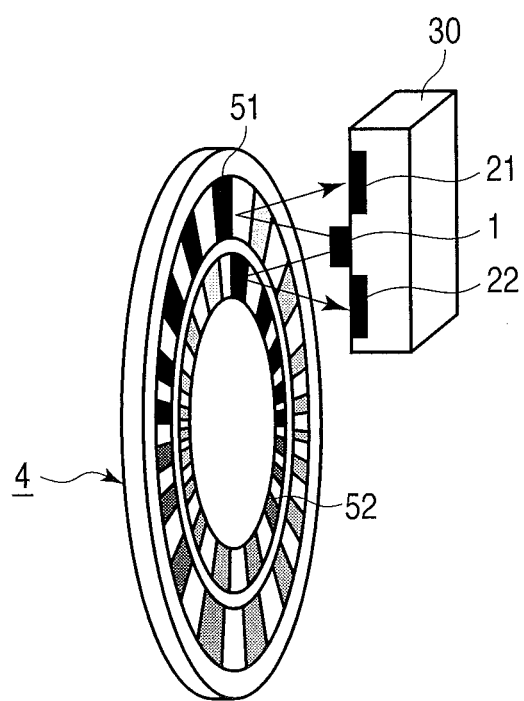
FIG. 23 is a perspective view illustrating a configuration example of a scale and a sensor head, which are unique to an optical displacement detection apparatus according to a tenth modification.

A tenth modification relates to the configuration (shape) of the scale 4. FIG. 23 is a perspective view illustrating a configuration example of a scale and a sensor head, which are unique to an optical displacement detection apparatus according to the tenth modification.

As illustrated in FIG. 23, in the optical displacement detection apparatus of the tenth modification, the scale 4 is formed into a disc shape.

Specifically, in a disc surface of the disc-shape scale 4, the gray track 51 and the gray track 52 are provided into a belt shape along the outer circumference of the disc surface such that the effective reflectances can be detected in reverse phase.

On the other hand, in the sensor head 30, the first photodetector 21 is provided according to the position in which the gray track 51 is provided in the scale 4, and the second photodetector 22 is provided according to the position in which the gray track 52 is provided. The light source 1 is provided between the first photodetector 21 and the second photodetector 22.

According to the tenth modification, because the gray track is formed on the disc-shape scale 4, both the relative rotation angle and the absolute angle of the displacement detection target can highly accurately be detected.

[Second Embodiment]

An optical displacement detection apparatus according to a second embodiment of the invention will be described below with reference to the drawings. Only a difference with the optical displacement detection apparatus of the first embodiment will be described in order to avoid the overlapping description.

Figure 24:
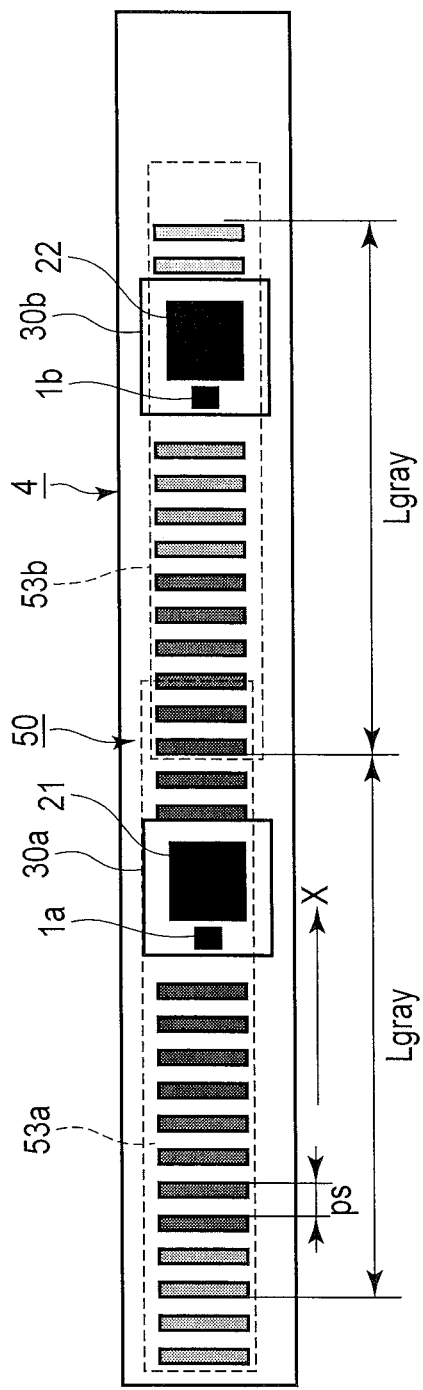
FIG. 24 is a view illustrating a configuration example of a scale of an optical displacement detection apparatus according to a second embodiment of the invention.

The optical displacement detection apparatus of the second embodiment differs mainly from the optical displacement detection apparatus of the first embodiment in the disposition configuration of the gray track. FIG. 24 is a view illustrating a configuration example of a scale of the optical displacement detection apparatus according to the second embodiment of the invention.

Specifically, in the optical displacement detection apparatus of the first embodiment, the two modulation code patterns are separately formed in the gray tracks on the scale 4 in parallel to each other. On the other hand, in the optical displacement detection apparatus of the second embodiment, two modulation code patterns 53a and 53b are disposed and formed in series on one gray track 50 as illustrated in FIG. 24.

In other words, in the optical displacement detection apparatus of the second embodiment, the first modulation code pattern 53a and the second modulation code pattern 53b are formed on the one gray track while coupled in series.

Particularly, in the predetermined zone Lgray in the x-direction that is of the direction in which the displacement is detected, the first modulation code pattern 53a in which the effective reflectance or the effective transmittance is gradually increased or decreased in the x-direction and the second modulation code pattern 53b in which the mirror inversion of the effective reflectance or the effective transmittance is generated from the first modulation code pattern 53a in relation to the x-direction are formed in series on the same gray track 50.

According to the scale 4 having the above configuration, a first sensor head 30a that detects the light beam reflected from the first modulation code pattern 53a and a second sensor head 30b that detects the light beam reflected from the second modulation code pattern 53b are provided within the interval corresponding to the predetermined zone Lgray in the x-direction.

In the above configuration, the light beams reflected from the first modulation code pattern 53a and the second modulation code pattern 53b can be detected in reverse phase by a first photodetector 21 and a second photodetector 22, respectively.

As described above, the optical displacement detection apparatus of the second embodiment has the same effect as that of the first embodiment, and the second embodiment can provide the optical displacement detection apparatus in which the scale 4 is further miniaturized by the above disposition configuration of the modulation code pattern.

Modifications of the optical displacement detection apparatus of the second embodiment will be described below.

[Eleventh Modification]

An eleventh modification relates to a configuration (shape) of a scale 4. FIG. 25 is a view illustrating a configuration example of an optical displacement detection apparatus according to the eleventh modification.

In the optical displacement detection apparatus of the eleventh embodiment, the scale 4 of the optical displacement detection apparatus of the second embodiment is formed into the cylindrical shape as illustrated in FIG. 25. In the outer circumferential surface of the cylindrical scale 4, the first modulation code pattern 53a and the second modulation code pattern 53b are formed into the belt shape on the one track while coupled in series so as to surround the outer circumferential surface.

The first photodetector 21 and the second photodetector 22 are provided in the first sensor head 30a and the second sensor head 30b, which are disposed opposite each other in relation to the scale 4, in order to detect the reflectances of the first modulation code pattern 53a and the second modulation code pattern 53b in reverse phase.

Similarly to the tenth modification, in the predetermined zone Lgray in the x-direction that is of the direction in which the displacement is detected, the first modulation code pattern 53a in which the effective reflectance or the effective transmittance is gradually increased or decreased in the x-direction and the second modulation code pattern 53b in which the mirror inversion of the effective reflectance or the effective transmittance is generated from the first modulation code pattern 53a in relation to the x-direction are formed in series on the same gray track 50.

In the above configuration, the changing effective reflectances of the two modulation code patterns can be detected in reverse phase.

According to the eleventh modification, because the gray track is formed on the cylindrical scale 4, both the relative rotation angle and the absolute angle of the measurement target can highly accurately be detected.

[Twelfth Embodiment]

In an optical displacement detection apparatus according to a twelfth modification, instead of providing the modulation code pattern on the scale 4, the "modulation gray scale pattern" that exerts the same function as the modulation code pattern by the change in geometrical distance between the photodetectors 21 and 22 is provided while integrated with the scale 4.

In the optical displacement detection apparatus of the eleventh modification, the scale 4 is formed into a cylindrical shape whose section is the circle. On the other hand, in the twelfth modification, the scale 4 is formed into a cylindrical shape whose section is not the circle.

FIG. 26 is a sectional view illustrating the case in which the scale 4 is cut in a position in which the modulation gray scale pattern is provided in the outer circumferential surface. As illustrated in FIG. 26, the sectional shape of the scale 4 is formed into not the circular shape whose radius has a constant value like the scale 4 of the eleventh modification, but the ellipsoidal shape.

In other words, the same effect as the above modulation code pattern, namely, the effect that the effective reflectance or the effective transmittance is gradually increased or decreased according to the rotation of the scale 4 can be obtained by providing the modulation gray scale pattern on the outer circumferential surface of the ellipsoidal scale 4 in which the sectional radius is gradually increased or decreased in the periodic manner.

Accordingly, in the above configuration of the twelfth modification, the geometric distance between the modulation gray scale pattern and the sensor head 30 is gradually changed, and the changing effective reflectances of the two modulation gray scale patterns can be detected in reverse phase.

[Thirteenth Embodiment]

In an optical displacement detection apparatus according to a thirteenth modification, instead of providing the modulation code pattern on the scale 4, the "modulation gray scale pattern" that exerts the same function as the modulation code pattern by the change in optical transmittance or optical transmittance between the photodetectors 21 and 22 is provided while integrated with the scale 4.

Figure 27:
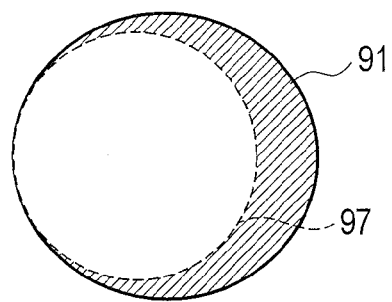
FIG. 27 is a sectional view illustrating the case in which a scale according to a thirteenth modification is cut in a position where a modulation code pattern is provided in an outer circumferential surface.

In the thirteenth modification, as illustrated in FIG. 27, a member 91 having a predetermined transmittance is provided in an outer circumferential surface 97 of the scale 4 (having the cylindrical shape whose section is the circle) of the optical displacement detection apparatus of the eleventh modification.

FIG. 27 is a sectional view illustrating the case in which the scale 4 is cut in a region where the modulation gray scale pattern is provided. As illustrated in FIG. 27, the sectional shape of the scale 4 is formed into the ellipsoidal shape by providing the member 91 having the predetermined transmittance on the outer circumferential surface 97.

Needless to say, the optical distance in the member 91 having the predetermined transmittance is different from the optical distance in air. Although the geometric distance between the light source 1 and each modulation gray scale pattern is equal, the optical distance is different (the optical distance is gradually increased or decreased by the above configuration).

Accordingly, in the above configuration of the thirteenth modification, the effect that the optical distance between the modulation gray scale pattern and the sensor head 30 is gradually changed and the effect that the thickness of the member having the predetermined transmittance is gradually increased or decreased to change the optical transmittance are added to gradually increase or decrease the effective reflectance of the scale pattern, which allows the changing effective reflectances of the two modulation gray scale patterns to be detected in reverse phase.

[Fourteenth Embodiment]

Figure 28:
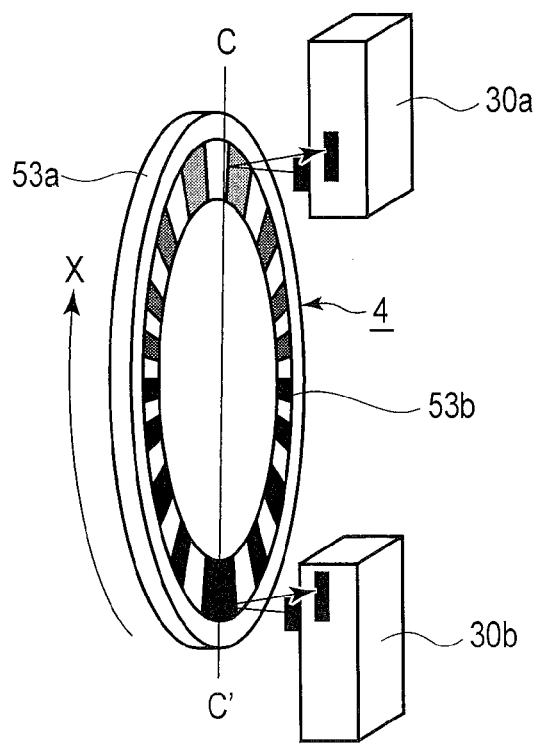
FIG. 28 is a perspective view illustrating a configuration example of a scale and a sensor head, which are unique to an optical displacement detection apparatus according to a fourteenth modification.
Figure 33:
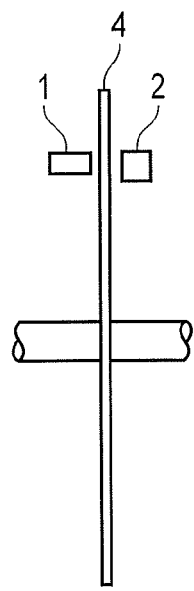
FIG. 33 is a sectional view illustrating a photoelectric detection apparatus disclosed in Patent Literature 1.
Figure 34:
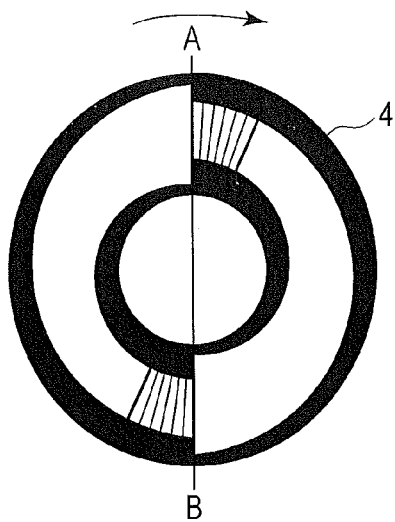
FIG. 34 is a plan view illustrating a scale of the photoelectric detection apparatus disclosed in Patent Literature 1.
Figure 35:
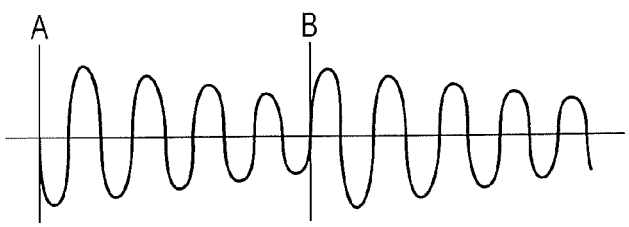
FIG. 35 is a view illustrating an output signal of the photoelectric detection apparatus disclosed in Patent Literature 1.
Figure 36:
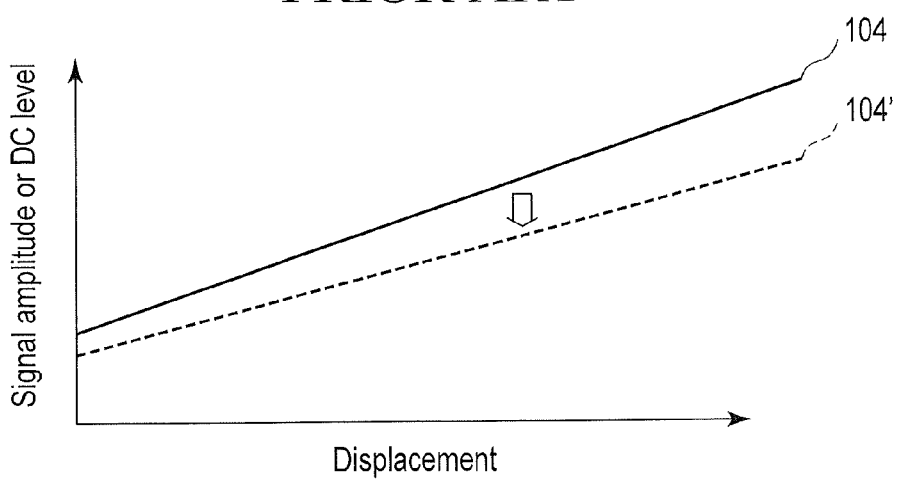
FIG. 36 is a view illustrating a characteristic of the output signal of the photoelectric detection apparatus disclosed in Patent Literature 1.
Figure 37:
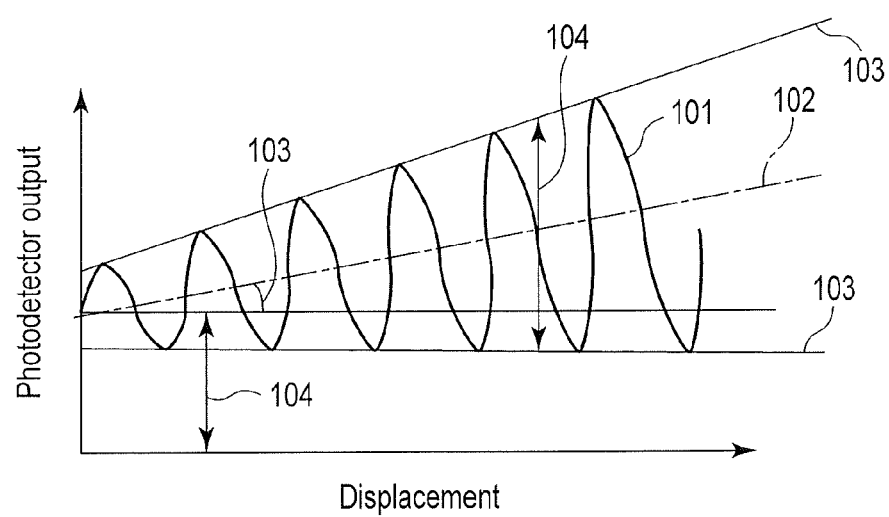
FIG. 37 is a view illustrating a characteristic of the output signal of the photoelectric detection apparatus disclosed in Patent Literature 1.

A fourteenth modification relates to the configuration (shape) of the scale 4. FIG. 28 is a perspective view illustrating a configuration example of a scale and a sensor head, which are unique to an optical displacement detection apparatus according to the fourteenth modification.

As illustrated in FIG. 28, in the optical displacement detection apparatus of the fourteenth modification, the scale 4 is formed into the disc shape. In the disc surface of the disc-shape scale 4, the first modulation code pattern 53a and the second modulation code pattern 53b are provided into the belt shape along the circumference of the disc surface while coupled to each other. In other words, the first modulation code pattern 53a and the second modulation code pattern 53b are configured to surround the circumference of the disc surface.

Particularly, the first modulation code pattern 53a and the second modulation code pattern 53b are formed such that the mirror inversion of the effective reflectance or the effective transmittance, which is gradually increased or decreased in the rotating direction, is generated in relation to a line segment C-C' of FIG. 28.

Accordingly, in order to detect the reflectance of the modulation code pattern in reverse phase, the first sensor head 30a and the second sensor head 30b are disposed so as to be located opposite each other in relation to the rotation center of the disc-shape scale 4.

[Third Embodiment]

An optical displacement detection apparatus according to a third embodiment of the invention will be described below with reference to the drawings. Only differences with the optical displacement detection apparatus of the first embodiment will be described in order to avoid the overlapping description.

The optical displacement detection apparatus of the third embodiment differs mainly from the optical displacement detection apparatus of the first embodiment in the configuration of the scale. FIG. 29 is a view illustrating a configuration example of the scale of the optical displacement detection apparatus according to the third embodiment of the invention.

Specifically, in the optical displacement detection apparatus of the third embodiment, a first gray scale pattern 551, a second gray scale pattern 552, and an encode pattern 553 are disposed in parallel on a scale 4 as illustrated in FIG. 29.

A first photodetector 521 that is of the photodetector corresponding to the first gray scale pattern 551, a second photodetector 522 that is of the photodetector corresponding to the second gray scale pattern 552, and a third photodetector 523 that is of the photodetector corresponding to the encode pattern 553 are provided on a sensor head 530.

The single light receiving element is provided in each of the first photodetector 521 and the second photodetector 522. On the other hand, similarly to the photodetector included in the optical displacement detection apparatus of the first embodiment, the third photodetector 523 includes the four groups of light receiving element arrays, and the four-phase periodic signals in which the phases are deviated from one another by the quarter period are output from the four groups of light receiving element arrays when the displacement detection target is displaced. The relative displacement of the target can stably and finely be detected by performing the processing described in the first embodiment.

As described above, the optical displacement detection apparatus of the third embodiment has the same effect as that of the first embodiment, and the third embodiment can provide the optical displacement detection apparatus in which the processing circuit can be simplified because there is no necessity of the processing of separating the amplitude component and the periodic component of the encoder signal.

Modifications of the optical displacement detection apparatus of the third embodiment will be described below.

[Fifteenth Embodiment]

A fifteenth modification relates to the configuration of the scale 4. FIG. 30 is a perspective view illustrating a configuration example of a scale and a sensor head, which are unique to an optical displacement detection apparatus according to the fifteenth modification.

In the optical displacement detection apparatus of the fifteenth modification, the first gray scale pattern 551 and the second gray scale pattern 552 are formed in parallel on the scale 4.

The sensor head 530 includes a light source 1 that irradiates the gray track in which the first gray scale pattern 551 is provided and the gray track in which the second gray scale pattern 552 is provided, a first photodetector 525 that corresponds to the first gray scale pattern 551, and a second photodetector 526 that corresponds to the second gray scale pattern 552.

In the optical displacement detection apparatus of the fifteenth modification, each of the first photodetector 525 and the second photodetector 526 is constructed by not the plural light receiving element arrays, but the single light receiving element.

The light beams emitted from the light source 1 is reflected by the first gray scale pattern 551 and the second gray scale pattern 552 on the scale 4, and the light quantities are detected by the first photodetector 525 and the second photodetector 526.

For example, a set of signals illustrated in FIG. 7 is obtained from the first photodetector 525 and the second photodetector 526, and a characteristic 105' that is monotonously increased relative to the displacement x and a characteristic 105 that is monotonously decreased relative to the displacement x are obtained as illustrated in FIG. 31. The calculations, which are described with reference to FIGS. 8 and 9, are performed for the obtained signals, which allows the displacement x to be stably and highly accurately detected.

According to the fifteenth modification, by previously displacing the predetermined zone, the absolute displacement can highly accurately be detected without recognizing the output characteristic.

[Sixteenth Embodiment]

A sixteenth modification relates to the configuration of the scale 4. FIG. 32 is a view illustrating a configuration example of a scale and a sensor head, which are unique to an optical displacement detection apparatus according to the sixteenth modification.

In the sixteenth modification, the reflectance of the pattern surface is not changed like the gray scale pattern of the fifteenth modification, but the reflectance is effectively changed by changing a pattern width.

Specifically, as illustrated in FIG. 32, a first pattern 561 and a second pattern 562 are formed into the wedge shape, and disposed in opposite directions to each other in relation to the displacement direction (x-direction).

In order to reduce an influence of a position deviation between a sensor head 30 and the scale 4, preferably the maximum width of the first pattern 561 is configured to be smaller than a diameter of the light beam on the scale 4.

In the optical displacement detection apparatus of the sixteenth modification, the effective reflectance of the pattern surface can easily linearly be changed by adopting the above configuration. Therefore, the absolute displacement can highly accurately be detected by utilizing the change in reflectance.

The changing effective reflectances of the two patterns can be detected in reverse phase by the above configuration.

The invention was described above based on the first to third embodiments, in which the inventions in various stages are included, and in which various inventions can be extracted from a proper combination of the disclosed plural constituents. For example, even if some constituents are deleted from all the constituents described in the embodiments, the configuration in which some constituents are deleted can be extracted as the invention when the problems described in the section of problem to be solved by the invention can be solved to obtain the effects described in the section of effect of the invention.

Further, the embodiments described herein include various steps of the invention. The invention may be embodied in various forms by combining the disclosed constituent elements. For example, even if some of the constituent elements are deleted, the invention may be extracted as modifications, as long as the theme to be solved by the invention can be resolved, and the effects of invention are obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical displacement detection apparatus that detects a displacement in a predetermined direction of a displacement detection target, the optical displacement detection apparatus comprising:
    a light source that emits a light beam;
    a scale in which a first track pattern and a second track pattern are formed while the predetermined direction is set to a longitudinal direction of each of the first track pattern and the second track pattern;
    a sensor head including a first photodetector that detects the light beam emitted from the light source through the first track pattern and generates a first signal and a second photodetector that detects the light beam emitted from the light source through the second track pattern and generates a second signal; and
    a signal processing unit that calculates the displacement based on the first signal and the second signal,
    wherein the scale or the sensor head is coupled to the displacement detection target,
    the first signal and the second signal include at least a first component that is offset by performing predetermined calculation of the first signal and the second signal and a second component that remains after the predetermined calculation and corresponds to an absolute displacement of the scale,
    and the first track pattern, the second track pattern, the first photodetector, the second photodetector, and the light source are disposed such that the detection of the first photodetector and the detection of the second photodetector are performed while correlated with each other.

2. The optical displacement detection apparatus according to claim 1, wherein a value of a sum of an amplitude component and/or a DC component in the first signal and an amplitude component and/or a DC component in the second signal varies due to various variation factors, and the predetermined calculation offsets a component that changes the value of the sum of the amplitude component and/or the DC component in the first signal and the amplitude component and/or the DC component in the second signal.

3. The optical displacement detection apparatus according to claim 1, wherein the first track pattern and the second track pattern are formed in parallel on the scale.

4. The optical displacement detection apparatus according to claim 3, wherein the light source is disposed in a position in which a distance to the first track pattern and a distance to the second track pattern are equal to each other.

5. The optical displacement detection apparatus according to claim 1, wherein the first track pattern and the second track pattern are formed in series on the scale, and the light source includes a first light source that irradiates the first track pattern with the light beam and a second light source that irradiates the second track pattern with the light beam.

6. The optical displacement detection apparatus according to claim 1, wherein, when an optical pattern in which one of an effective reflectance, an effective transmittance, and diffraction efficiency is gradually increased or decreased in a predetermined zone in the predetermined direction is defines as a gray scale pattern, when an optical pattern in which one of the effective reflectance, the effective transmittance, and the diffraction efficiency is changed in a predetermined spatial period in the predetermined direction is defined as an encode pattern, when a pattern having an optical characteristic in which the gray scale pattern and the encode pattern are superposed is defined as a modulation code pattern, and when a track that includes one of the gray scale pattern and the modulation code pattern is defined as a gray track, at least a first gray track and a second gray track are formed in the scale.

7. The optical displacement detection apparatus according to claim 6, wherein at least the first modulation code pattern and the second modulation code pattern are formed on the scale, the sensor head and the scale are disposed such that the light beam emitted from the light source is transmitted, reflected, or diffracted by the modulation code pattern to form a periodic pattern having a spatial period pi on light receiving surfaces of the first photodetector and the second photodetector, a plurality of light receiving element arrays each of which has an identical diffraction pattern having the spatial period pi or a spatial period of an integral multiple of the spatial period pi are formed on the light receiving surfaces of the first photodetector and the second photodetector, the plurality of light receiving element arrays are disposed and configured while deviated from each other in the predetermined direction such that the diffraction patterns are detected with different spatial phase difference, and the optical displacement detection apparatus comprises: a multi-channel addition calculator that adds outputs from the light receiving elements receiving an in-phase portion of the diffraction pattern in the plurality of light receiving element arrays in the first photodetector and the second photodetector; and a relative position calculator that calculates a relative displacement by combining outputs from a plurality of channels of the addition calculator.

8. The optical displacement detection apparatus according to claim 6, wherein the first track pattern and the second track pattern adopt a configuration in which shading is continuously and gradually changed in the predetermined direction or a configuration in which the shading is discretely and gradually changed in the predetermined direction.

9. The optical displacement detection apparatus according to claim 6, wherein, in the first track pattern and the second track pattern, the optical pattern in which one of the effective reflectance and the effective transmittance is gradually increased or decreased in the predetermined direction and the optical pattern in which one of a reflectance, a transmittance, and a diffraction characteristic is periodically changed are integrally or separately formed.

10. The optical displacement detection apparatus according to claim 6, wherein a geometric distance or an optical distance between the first track pattern and the second track pattern and the sensor head or a transmittance in an optical path of the light beam, which is detected by the first photodetector and the second photodetector, is gradually changed in the predetermined direction.

11. The optical displacement detection apparatus according to claim 1, wherein the signal processing unit includes: an extraction processing unit that extracts a signal relating to the DC component in each of the first signal and the second signal or a signal relating to the amplitude component in each of the first signal and the second signal based on the first signal and the second signal; and an absolute displacement calculation unit that calculates the absolute displacement of the scale in a predetermined zone by performing subtraction processing of DC components or amplitudes, which are extracted by the extraction processing unit.

12. The optical displacement detection apparatus according to claim 11, wherein the first track pattern and the second track pattern are an optical pattern in which one of the effective reflectance, the effective transmittance, and the diffraction efficiency is substantially linearly increased or decreased in opposite directions to each other in the predetermined direction and an optical pattern in which the value of the sum of a value of one of the effective reflectance, the effective transmittance, and the diffraction efficiency of the first track pattern detected by the first photodetector and a value of one of the effective reflectance, the effective transmittance, and the diffraction efficiency of the second track pattern detected by the second photodetector is substantially kept constant, and the absolute displacement calculation unit detects the absolute displacement by calculating a ratio of a value in which a set of values extracted by the extraction processing unit is subtracted from each other and a value in which the set of values extracted by the extraction processing unit is added to each other.

13. The optical displacement detection apparatus according to claim 11, wherein the first track pattern and the second track pattern are an optical pattern in which one of the effective reflectance, the effective transmittance, and the diffraction efficiency is substantially linearly increased or decreased in opposite directions to each other in the predetermined direction and an optical pattern in which the value of the sum of a value of one of the effective reflectance, the effective transmittance, and the diffraction efficiency of the first track pattern detected by the first photodetector and a value of one of the effective reflectance, the effective transmittance, and the diffraction efficiency of the second track pattern detected by the second photodetector is substantially kept constant, the absolute displacement calculation unit includes a storage unit, in which the set of signals extracted by the extraction processing unit is added to each other at a beginning of the operation of the optical displacement detection apparatus or predetermined timing and the addition result is retained or updated as a reference value, and the absolute displacement calculation unit detects the absolute displacement by calculating a ratio of the set of values extracted by the extraction processing unit is subtracted from each other and reference value.

14. An optical displacement detection apparatus that detects a displacement in a predetermined direction of a displacement detection target, comprising: a light source that emits a light beam;

a scale in which a first track pattern and a second track pattern are formed on an identical surface while the predetermined direction is set to a longitudinal direction of each of the first track pattern and the second track pattern;

a sensor head including a first photodetector that detects the light beam, which is emitted from the light source and reflected by the first track pattern, and generates a first signal and a second photodetector that detects the light beam, which is emitted from the light source and reflected by the second track pattern, and generates a second signal; and a signal processing unit that calculates the displacement based on the first signal and the second signal, wherein the scale or the sensor head is coupled to the displacement detection target, the first signal and the second signal include at least a first component that is offset by performing predetermined calculation of the first signal and the second signal and a second component that remains even after the predetermined calculation and is unique to an arbitrary position, and the first track pattern, the second track pattern, the first photodetector, the second photodetector, and the light source are disposed such that the detection of the first photodetector and the detection of the second photodetector are performed while correlated with each other.

* * * * *